United States Patent [19]

Dearing, Sr. et al.

[11] Patent Number: 5,503,473
[45] Date of Patent: Apr. 2, 1996

[54] AUTOMATIC CEMENTING SYSTEM FOR PRECISELY OBTAINING A DESIRED CEMENT DENSITY

[75] Inventors: Michael P. Dearing, Sr., Cypress; Robert A. Baten, Friendswood; Greg L. Cedillo, Houston; Bruce A. Vicknair, Baytown, all of Tex.

[73] Assignee: Stewart & Stevenson Services, Inc., Houston, Tex.

[21] Appl. No.: 178,659

[22] Filed: Jan. 7, 1994

Related U.S. Application Data

[60] Continuation-in-part of Ser. No. 969,944, Oct. 30, 1992, abandoned, which is a division of Ser. No. 389,923, Aug. 2, 1989, Pat. No. 5,281,023.

[51] Int. Cl.$^6$ .................................................. B01F 15/04
[52] U.S. Cl. .................. 366/2; 366/17; 366/20; 366/152.2; 166/308
[58] Field of Search .................. 366/17, 20, 2, 366/65, 152; 137/13; 73/151; 166/308, 280

[56] References Cited

U.S. PATENT DOCUMENTS

| 4,091,462 | 5/1978 | Igarashi et al. ......................... 366/17 |
| 4,538,222 | 8/1985 | Crain et al. . | |

FOREIGN PATENT DOCUMENTS

| 260470 | 4/1970 | U.S.S.R. ................................. 366/17 |
| 719881 | 3/1980 | U.S.S.R. ................................. 366/17 |
| 814924 | 3/1981 | U.S.S.R. ................................. 366/17 |
| 1110644 | 8/1984 | U.S.S.R. ................................. 366/17 |

OTHER PUBLICATIONS

Documents relating to communications between assignee Stewart & Stevenson, and Servicios Especiales San Antonio, S.A.

Documents relating to communications between assignee Stewart & Stevenson, and Globe Oilwell Services, Inc.

Primary Examiner—Frankie L. Stinson
Attorney, Agent, or Firm—Gregory L. Maag; Michael F. Heim

[57] ABSTRACT

An automatic cementing system and method are disclosed for precisely controlling the density of a slurry during a continuously mixed cement application. The system includes an input water line and a dry cement hopper for supplying water and dry cement, respectively, to a mixing chamber. The mixing chamber includes two chambers, Chamber A and Chamber B, for thoroughly mixing the water and cement together to form a cement slurry. Chamber B includes a level sensor for measuring the change in slurry level. The input line includes a pump for supplying the water to the mixing chamber, and a flow meter for measuring the rate at which the water is supplied. Similarly, the hopper includes a rotary valve for regulating the rate at which the dry cement is supplied to the mixing chamber and a speed sensor for measuring the speed of the rotary valve. A discharge line with a discharge pump and a discharge flow meter receives and discharges cement slurry. A recirculation line is included for density control during initialization. A system controller receives operational parameters from the operator, including desired slurry density, mix water density and dry cement density. Once the rate of the input pump is set, the controller monitors the output from the level sensor in Chamber B and adjusts the rotary valve until the level of slurry in Chamber B is constant. At that time, the amount of water leaving the system as slurry is calculated by the controller, and the controller then sets the rate of the input pump based upon this calculation.

17 Claims, 9 Drawing Sheets

AUTOMATIC CEMENTING SYSTEM FOR PRECISELY OBTAINING A DESIRED CEMENT DENSITY

BACKGROUND OF THE INVENTION

This invention is a continuation-in-part of U.S. Ser. No. 07/969,944, filed Oct. 30, 1992, now abandoned which was a divisional application of U.S. Ser. No. 07/389,923, filed Aug. 2, 1989, now U.S. Pat. No. 5,281,023.

The invention disclosed herein relates generally to an apparatus and method for obtaining a slurry with a desired density during a continuous-mixing operation. More particularly, the invention relates to an automated system for automatically controlling the density of a cement slurry with a very high degree of precision for use in well completions.

Systems for mixing dry cement with water are well known in the art. Typically, cement mixing for large jobs is either done by batch-mixing or by continuous-mixing. A batch-mixing operation occurs when the ingredients are mixed in a large tank or blender to obtain the entire volume of cement slurry before the start of the job. A continuous-mixing job, conversely, is an operation in which the ingredients are continuously mixed during the course of the job to produce a slurry for immediate use. The advantages of batch-mixing cement is that the density can be controlled very accurately. The disadvantage is that batch-mixing may prove to be impossible or impractical on large jobs in which a large volume of cement slurry must be generated. Because the slurry is premixed in a batch job, a blender or tank must be provided that is large enough to hold all of the slurry to be used on that particular job. Continuous mixing alleviates this problem, in that the slurry is mixed "on the fly" in a relatively small mixing chamber and is used immediately.

One problem, however, with continuously mixing the slurry is that it is very difficult to control the density of the slurry with any decree of precision because ingredients are constantly being added and slurry is constantly being discharged. As a result, it is common to have fluctuations in slurry density during continuous-mix operations. In certain applications, cement density fluctuation can cause severe problems. One example where cement density fluctuations are particularly undesirable is in cementing operations for casing a wellbore. The density of cement is especially critical for such cementing operations.

Cement is used in wells to secure casing in place in a wellbore to "complete" the well. The purpose of the cement is to seal and block various zones between the casing and the wellbore. Special additives may be mixed with the cement to alter specific properties of the cement, as required by the wellbore and casing characteristics and relationships. A general overview of cementing casing may be found in Skinner, D. R., *Introduction to Petroleum Production*, Volume I, Chapter 4: Well Completion (Gulf Publishing Co. 1981), and in Moore, Preston L., *Drilling Practices Manual*, Chapter 16 (PennWell Publishing Co. 1974).

Several terms commonly are used in cementing operations, as follows:

Cement Slurry refers to the mixture of dry or powdered cement and water that is injected or pumped into the wellbore;

Slurry volume refers to the volume of slurry that is obtained when a given volume of dry cement is mixed with a given volume of water; and Slurry density refers to the amount of dry cement per volume of water, and typically is measured in terms of pounds per gallon (also referred to as "PPG");

Different cements cure in different ways; for example, some cements expand as they cure, while others shrink. During the curing process, cement generally increases in temperature. Some cement mixtures will crack or become increasingly permeable as a result of this increase in temperature during the curing process. Because the heat of the earth increases at greater depths, cracking of the cement becomes more pronounced as the depth of the wellbore increases if cement is used downhole in wells.

The cement and water typically are mixed on site during a cementing operation because most wells are located in remote locations where it is impractical to use large mixing tanks. Such an application commonly is referred to as a continuous-mixing job. The materials used in the cement are usually prepared dry and transported to the well site, where it is mixed with liquid or "mix water" and pumped into the well. Various dry or liquid additives also may be added to either the mix water or to the dry cement as desired to alter the properties of the cement slurry. The cement slurry normally is pumped in liquid form into a wellbore by pumping the slurry down the interior of the casing and forcing the slurry to flow from the bottom of the casing back upward between the casing and the wellbore. After the cement has been pumped into the wellbore, it must be allowed to cure for a certain period of time that can vary between 12–72 hours.

By evaluating the wellbore and formation characteristics, a person skilled in the art can determine with a good deal of precision the preferred cement density to use during the cement job to most effectively protect the casing and separate producing formations. If a cement slurry density could be maintained within a tight tolerance of ±0.1 lbs/gallon (PPG) of the preferred density, the probability of a successful cementing operation would be much higher. Some authors have stated that proper mixing of the cement slurry is critical to successful completion of a cementing job on a well, and have proposed systems to alleviate this problem with density control in continuous-mixing operations. See e.g. Galiana, et. al., "Cement Mixing: Better Understanding and New Hardware," *Oilfield Review*, (April 1991); Hitt, et. al., "Process Control of Slurry Density: Impact on Field Performance of Slurry Density," presented at the Society of Petroleum Engineers' Production Operations Symposium held in Oklahoma City, Okla., Apr. 7–9, 1991; O'Neill, et. al., "New Slurry Mixer Improves Density Control in Cementing Operations," presented at the Society of Petroleum Engineers' Latin America Petroleum Engineering Conference held in Rio de Janeiro, Oct. 14–19, 1990; Wienck, et. al., "Automatic Control of Bulk Cement Tank Levels," presented at the 24th Annual Offshore Technology Conference in Houston, Tex., May 4–7 1992; and Stegemoeller, et. al., "Automatic Density Control and High Specific Mixing Energy Deliver Consistent High-Quality Cement Slurries," presented at the 24th Annual Offshore Technology Conference in Houston, Tex., May 4–7, 1992.

Unfortunately, the prior art continuous-mix cementing systems have been unable to guarantee the density of the cement slurry within an acceptable tolerance level. Most prior art cementing systems are subject to a wide fluctuation in cement slurry density. See the discussion in Galiana, et. al., "Cement Mixing: Better Understanding and New Hardware," *Oilfield Review*, (April 1991). Even the systems developed more recently have encountered difficulty in obtaining a slurry density within ±0.1 lbs/gallon. Id. One of the reasons for this variance is that the meters and valves used in the mixing and density control systems typically are designed to be within a predetermined accuracy. Consequently, a certain amount of error is common in most meters. This is especially true with respect to the dry cement delivery system. Compounding this problem is the fact that many density control systems attempt to obtain a desired density by fixing the amount of dry cement to be delivered, while adjusting the rate at which water is input based upon feedback from a density sensor. See e.g. Stegemoeller, et. al. "Automatic Density Control and High Specific Mixing Energy Deliver Consistent High-Quality Cement Slurries," presented at the 24th Annual Offshore Technology Conference in Houston, Tex., May 4–7, 1992. The meters and valves associated with the dry cement delivery system have a relatively large error associated with them that makes any control system suspect that is based upon setting the delivery of dry cement to a fixed level. This error results from a number of factors such as the tendency of the dry cement to coagulate. Because of the difficulty in handling and supplying dry cement during a cementing operation, it is very difficult to maintain a constant slurry density.

Because of the inherent inaccuracy in all of the meters and valves typically used in an automatic density system, and especially those related to the dry cement delivery system, it is extremely difficult to design a system that can very accurately and precisely control the density of a cement slurry. It is an object of the present invention to automatically control the density of the cement slurry obtained in a continuous-mixing application to within ±0.1 lbs/gallon (PPG) of the desired density for cementing operations that is relatively independent of the error inherent in the meters and valves used in the system and especially those related to the dry cement delivery system.

SUMMARY OF THE INVENTION

The present invention comprises a system and method for automatically and precisely controlling the density of a cement slurry, which preferably includes a fresh water input device, such as a pump or a valve, and a dry cement delivery system, supplying mix water and cement, respectively, to a mixing chamber. The mixing chamber combines the mix water and cement to obtain a cement slurry that is discharged through a discharge line to a well or other desired location. The rate and amount of slurry being discharged is measured by a discharge flow meter. The input mix water line includes a flow meter and the dry cement delivery system includes a valve or other device for regulating the amount of dry cement delivered to the mixing chamber.

The system controller also preferably receives as inputs from an operator (1) the desired or target slurry density in pounds per gallon (PPG); (2) the density of the input mix water in specific gravity units; and (3) the absolute density of the dry cement, in specific gravity units.

The discharge line of the system preferably includes a discharge valve and a discharge flow meter. The discharge flow meter provides an indication of the rate at which slurry is being discharged. With this information, and the information provided by the operator, the controller determines the percent by volume of dry cement in the cement slurry. In other words, the controller determines how much dry cement is leaving the system as part of the cement slurry. Once the percent by volume of dry cement is known, the controller then determines the percent by volume of liquid in the cement slurry. After the controller determines the percent by volume of liquid in the slurry, the controller calculates the amount of liquid that must be supplied to the system through the input line by multiplying the discharge rate by the percent by volume of liquid in the slurry. In this manner, the controller insures that the same amount of liquid is flowing into the system as is flowing out as a component of the cement slurry. Once the controller determines the proper input rate of liquid into the system, the controller adjusts the input pump or input valve to provide the mix water at the required rate. The input flow meter is used as feedback to bring the input water device to the proper speed or position.

After the input device is set at the proper speed or position, the controller sets an approximate speed or position for the valve to control the delivery of dry cement. The controller uses the percent by volume of cement in the slurry and the discharge rate, together with other factors, to determine the desired quantity of dry cement to deliver. The controller then compares the desired quantity of dry cement to the delivered with the measured valve and modifies the valve as necessary to modify the delivery of dry cement.

The mixing chamber preferably comprises a divided tub, with Chambers A and B, for receiving water and dry cement, with the discharge line connected to the chamber B. In addition, a tub level sensor is provided to monitor the change in slurry level in chamber B. After setting the approximate speed of the dry cement valve, the controller adjusts the speed or position of the valve to precisely control the amount of dry cement supplied to the mixing chamber, based upon the level sensor. The controller continues to adjust the speed or position of the valve until the level of slurry in chamber B remains constant.

The invention also preferably includes a recirculation line to permit the density of the slurry to be brought to the desired density before it is discharged, and before automatic operation begins. The recirculation line includes a density meter for measuring the density of the cement slurry and for providing an indication of that density to the system controller.

These and other advantages and details of the invention will become apparent from a review of the Detailed Description which follows.

BRIEF DESCRIPTION OF THE DRAWINGS

For a detailed description of the preferred embodiment of the invention, reference will be made now to the accompanying drawings, wherein.

DESCRIPTION OF THE PREFERRED EMBODIMENT

Figure 1:
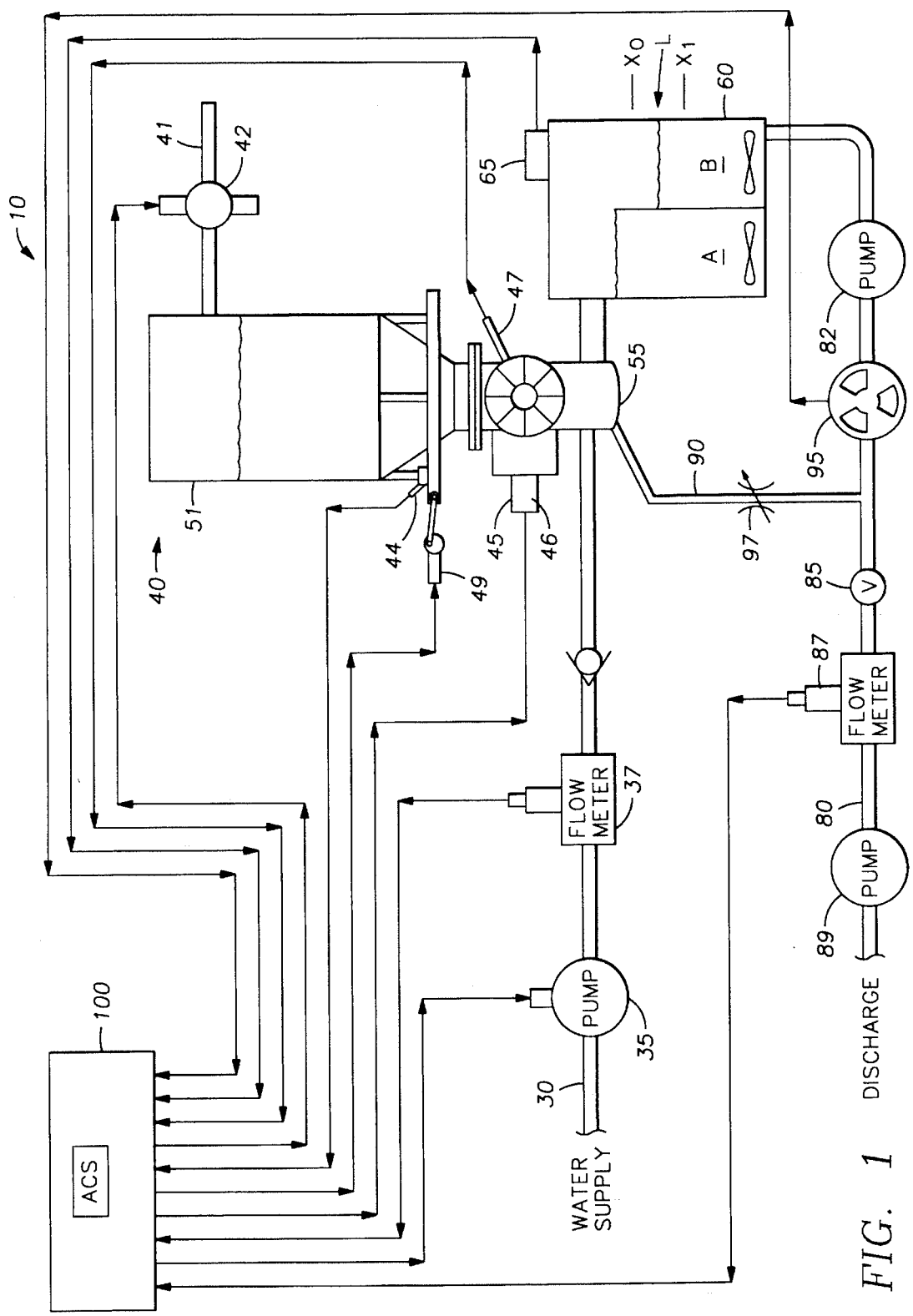
FIG. 1 is a schematic illustration of the configuration of the Automatic Cementing System of the preferred embodiment.
Figure 2A:
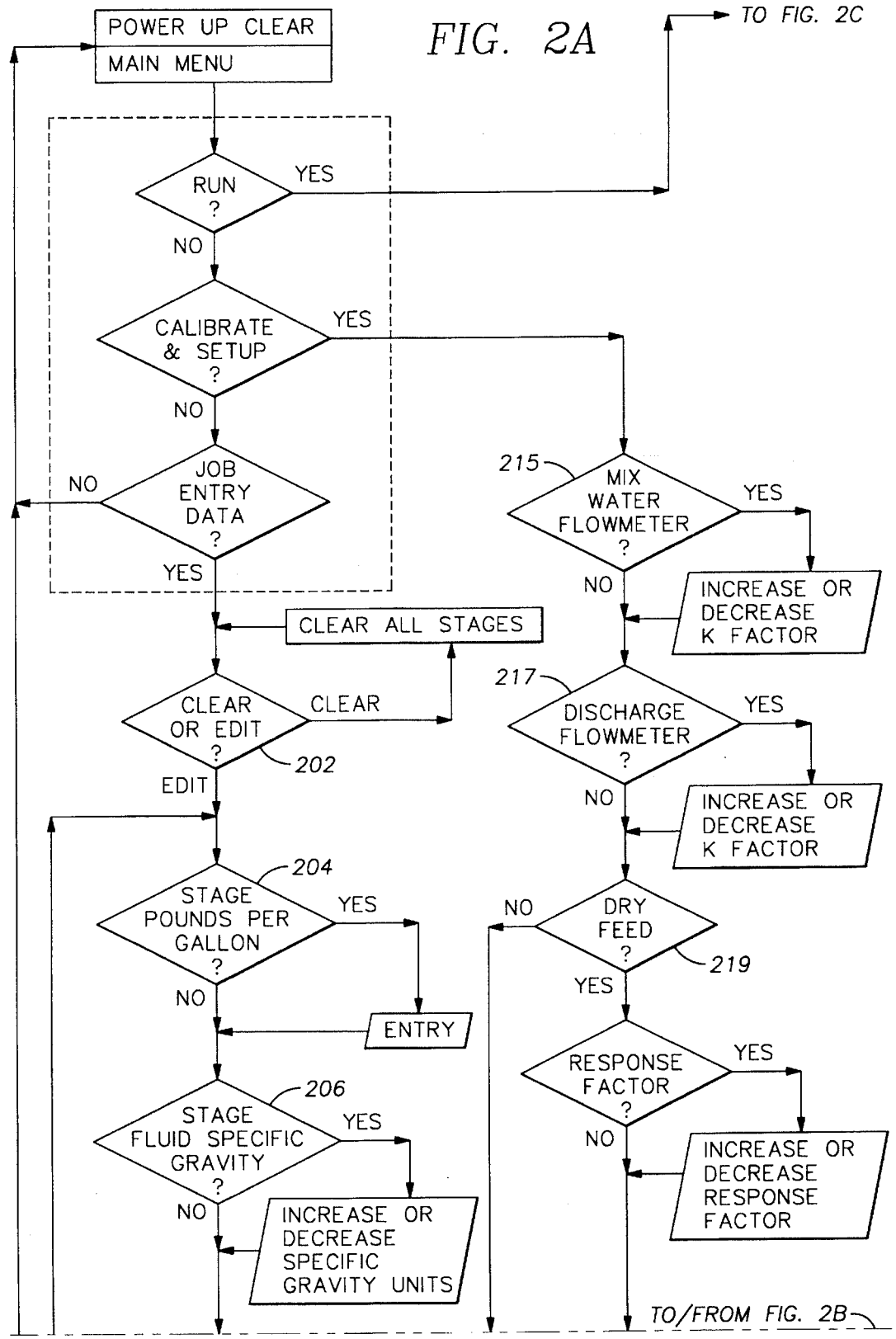
FIG. 2A–2F illustrates a flow chart of the operation of the ACS system of FIG. 1.
Figure 2B:
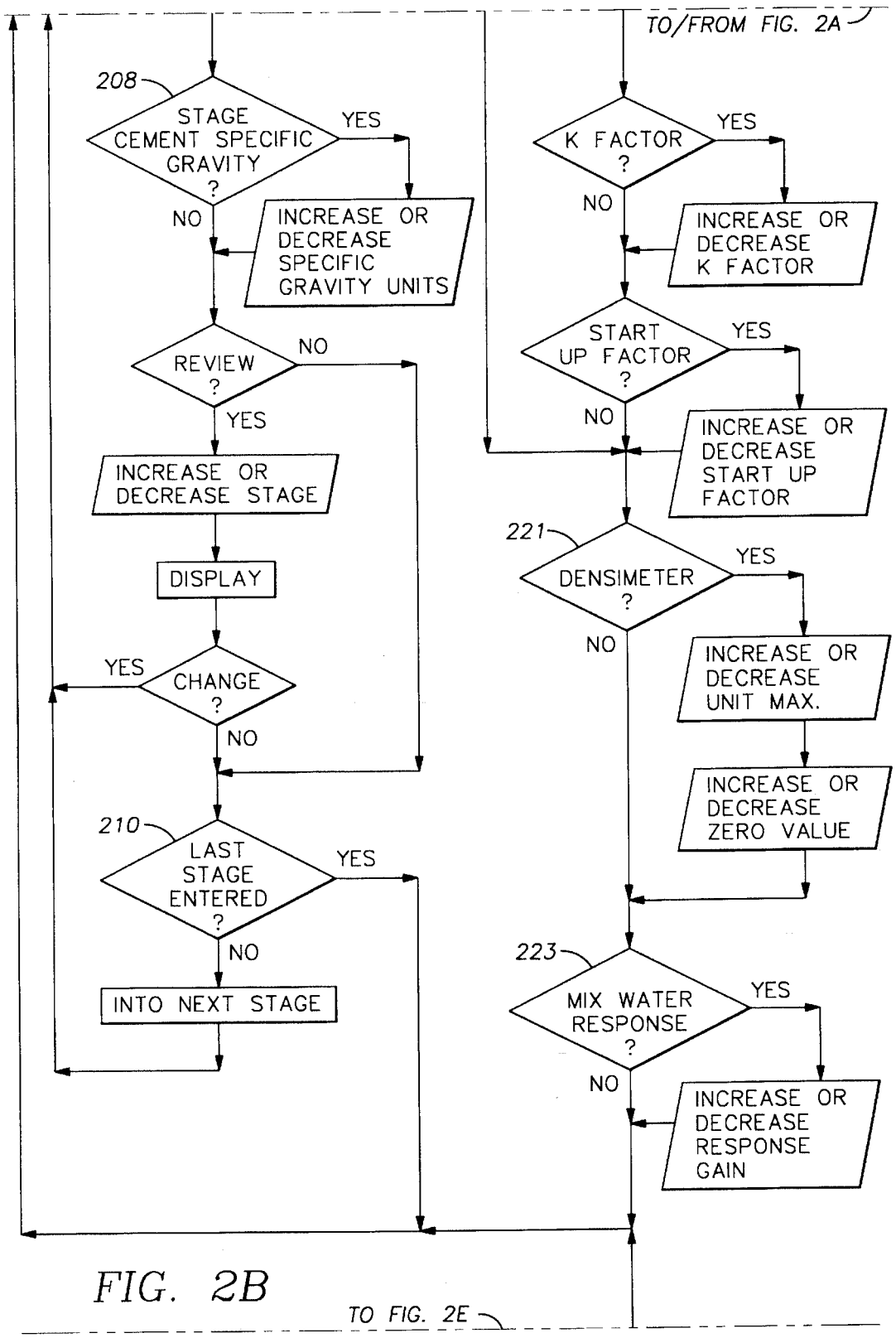
Figure 2C:
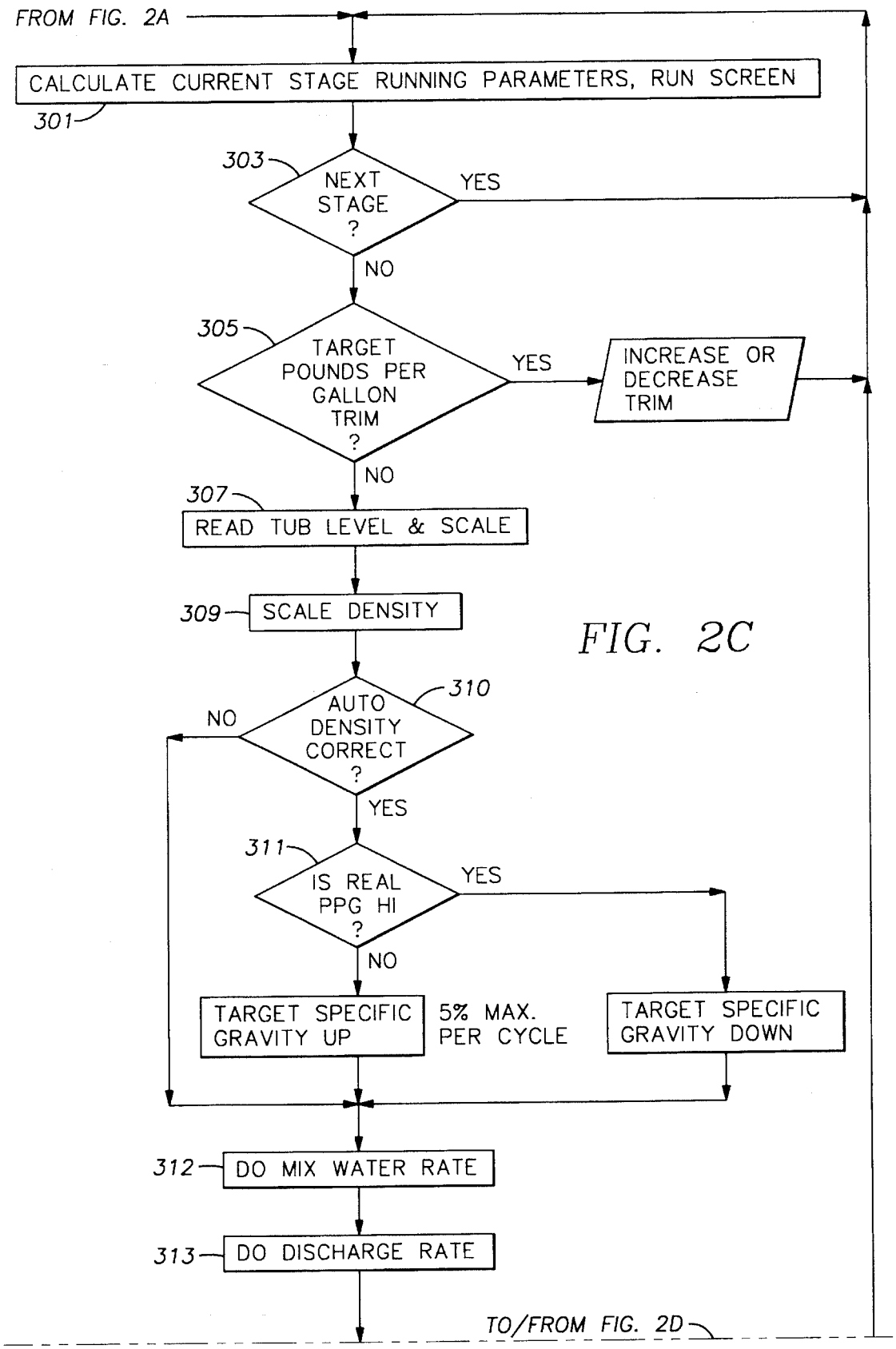
Figure 2D:
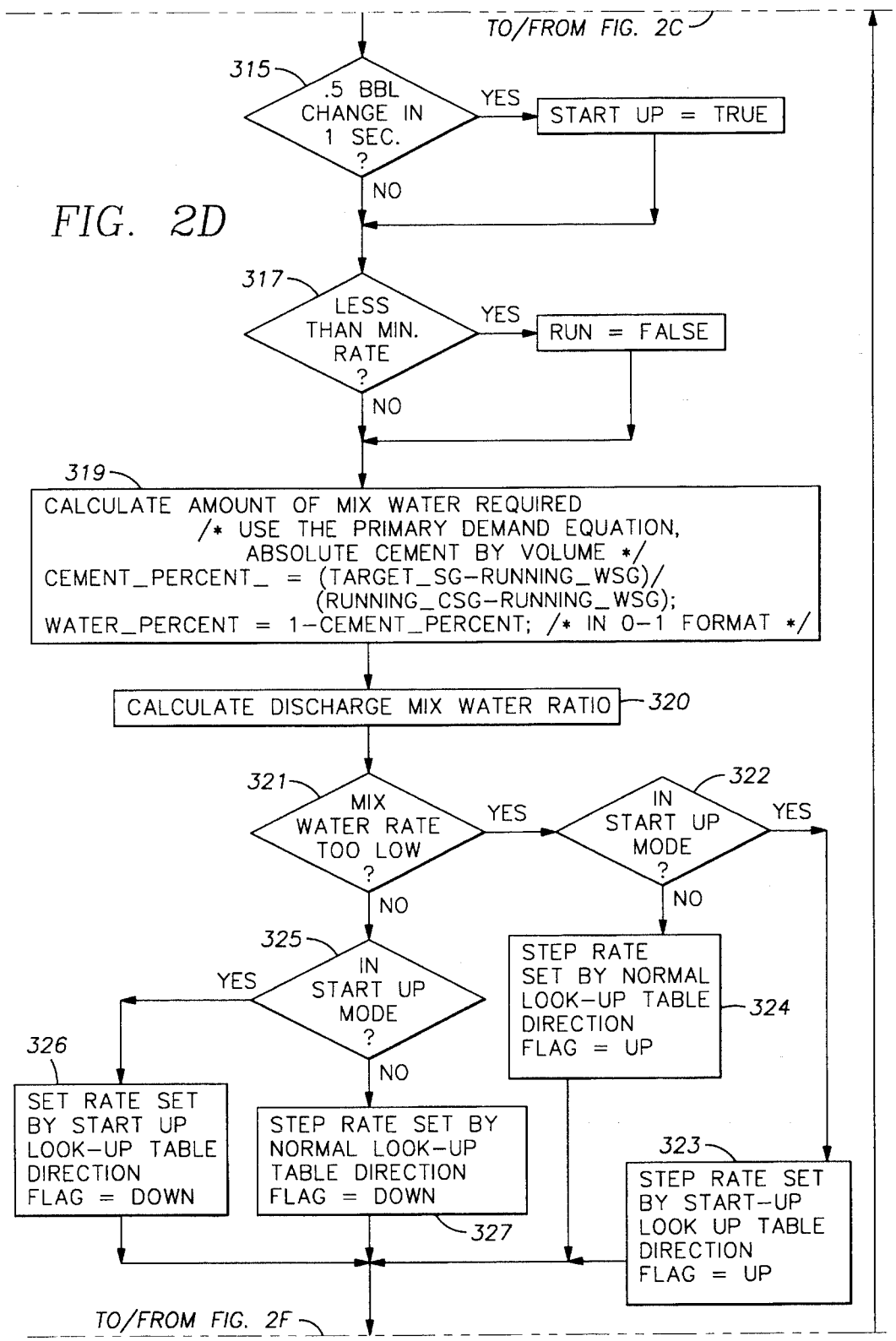
Figure 2E:
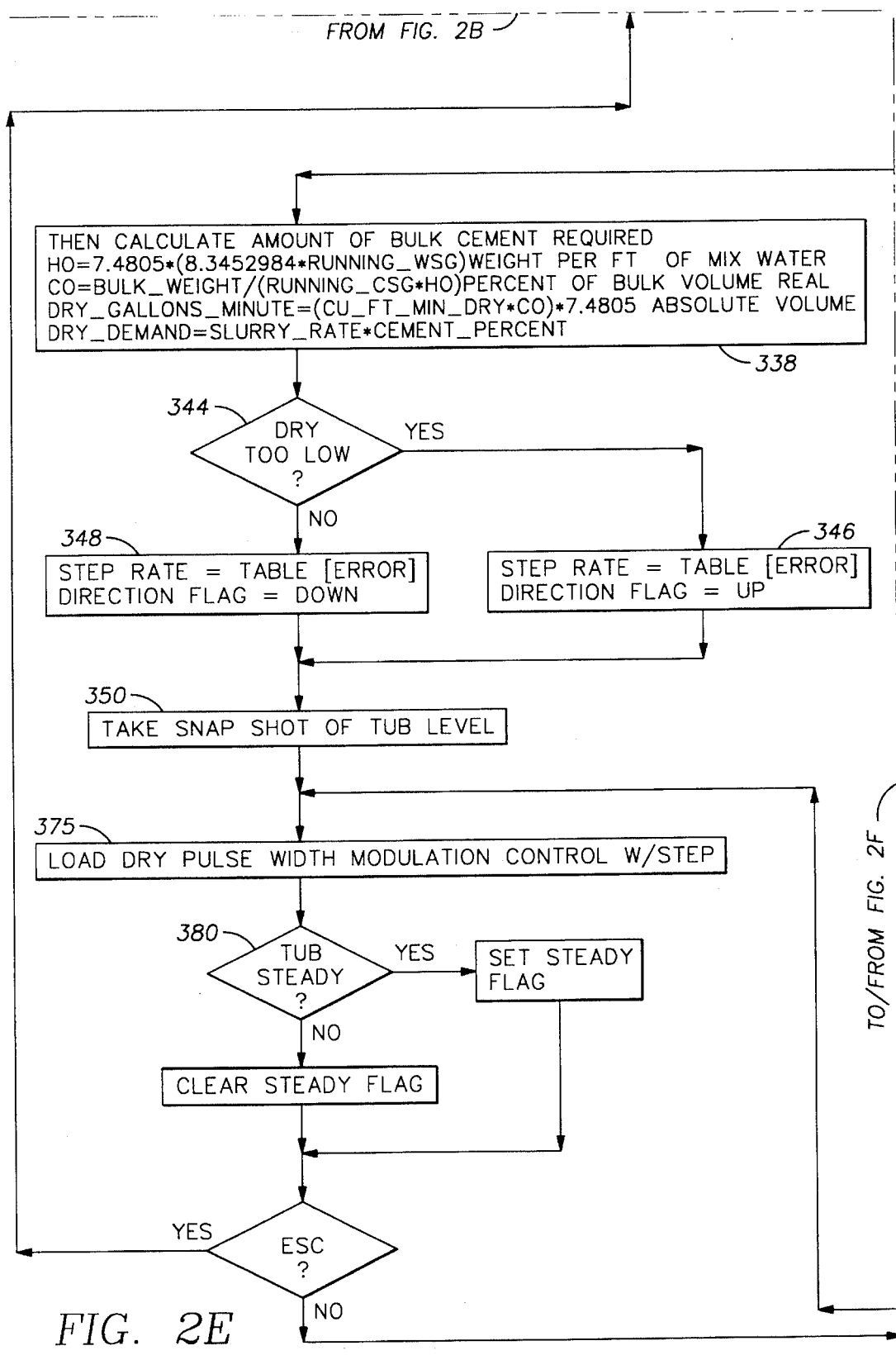
Figure 2F:
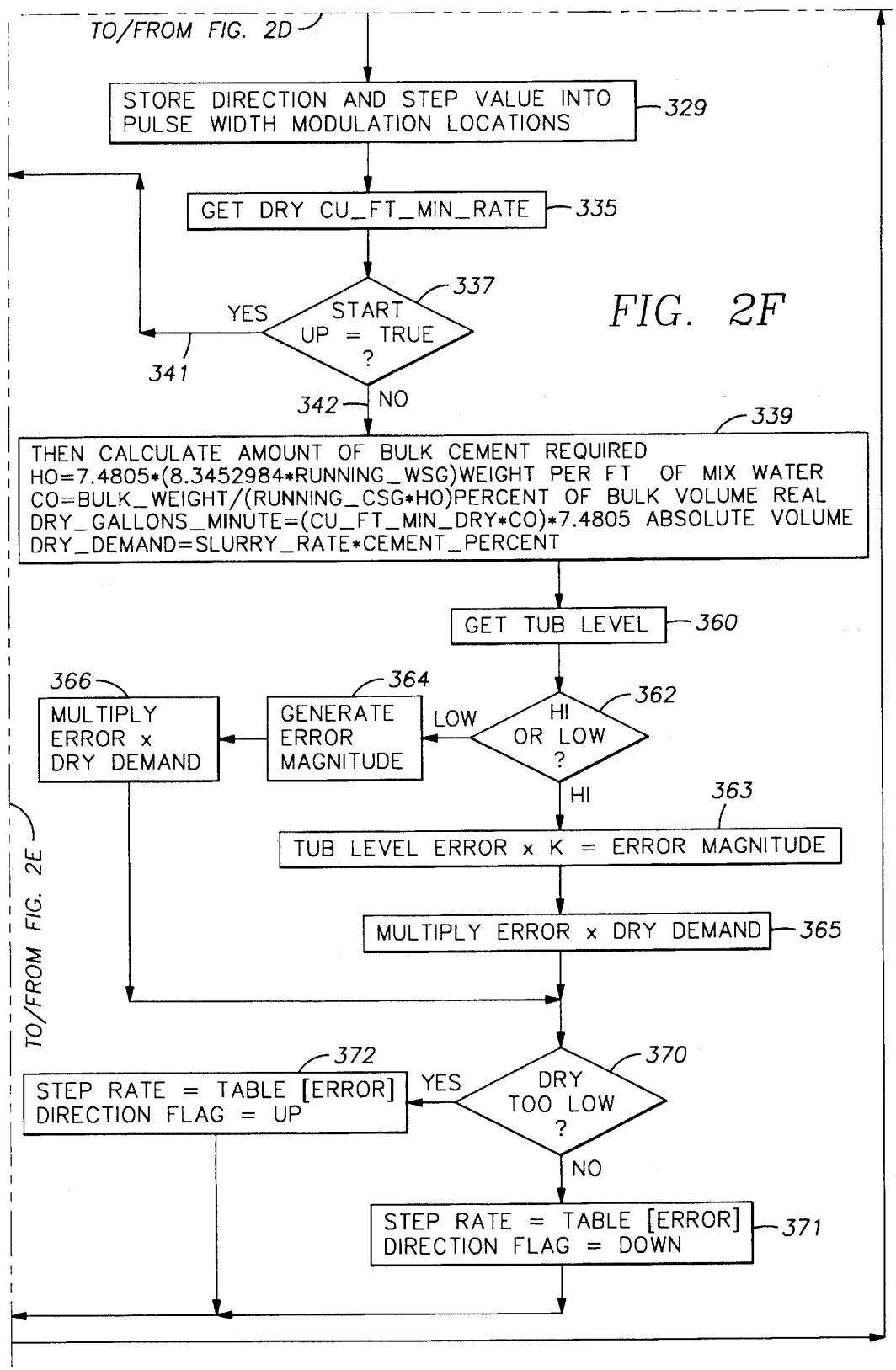

Referring now to FIG. 1, the Automatic Cementing System ("ACS") 10 constructed in accordance with the preferred embodiment generally comprises an input (or "mix") water supply line 30, a dry cement source 40 for supplying dry cement, a mixing chamber 60 for mixing dry cement and water, a cement slurry discharge line 80, a recirculating slurry line 90, and a system controller 100 for receiving output signals from the various system components and for providing control signals to regulate the operation of the ACS system.

The input water supply line 30 preferably provides mix water (or other base liquid) to the mixing chamber 60 for mixing with the dry cement from source 40. The water supply line 30 preferably includes a fresh water pump 35, an input flow meter 37, and a mixing bowl 55 for receiving dry cement from hopper 51. Alternatively, a centrifugal pump (not shown) may be used with an input valve instead of a positive displacement pump. Similarly, mixing of the cement and water can take place in a jet mixer instead of a mixing bowl 55. The water/cement mixture preferably flows from mixing bowl 55 (or jet mixer) into mixing chamber 60.

In the preferred embodiment, the pump 35 comprises a positive displacement pump, while the input flow meter 37 comprises mag-type flow meter. The pump 35 (or input valve, in the alternative embodiment) preferably connects electrically to the system controller 100 for receiving control signals. The input flow meter 37 preferably connects electrically to the system controller 100 and provides an electrical signal to the controller 100 that is indicative of the flow rate of mix water into the mixing chamber 60. Preferably, the input flow meter has an accuracy of 0.50%. The water supply line 30 preferably connects to a fresh water supply (not shown), which may be mounted on a truck, or which may comprise a water tower or other available water source capable of generating the required volume at the requisite rate.

The apparatus for providing dry or powdered cement to the mixing chamber 60 preferably comprises a hopper 51 that includes a supply conduit 41, a weight sensor 44, a valve 45 in combination with a valve sensor 47, and a vibrator motor 49. As one skilled in the art will immediately realize, many other delivery systems may be used without departing from the principles of this invention. For example, an air slide may be used instead of the vibrator to insure uninterrupted flow of cement into the valve 45. The hopper 51 receives the dry cement through conduit 41, which connects the hopper 51 to a source of dry cement (not shown). In accordance with conventional techniques, dry additives may be combined with dry cement either before or during the cement operation. In addition, to insure a good flow of dry cement through conduit 41, the dry cement preferably is blown through conduit 41. The conduit 41 preferably includes a cement inlet control valve 42 that connects electrically to the system controller 100 and which receives control signals from the controller 100. In response to the control signals from controller 100, the inlet control valve is positioned to regulate the amount of dry cement supplied to the hopper 51. As noted, the hopper 51 also preferably includes a weight sensor 44 for determining the amount of cement in the hopper 51 by weight. Weight sensor 44, which preferably comprises a load cell, also connects electrically to the system controller 100 for providing an electrical signal to the controller 100 that represents the weight, and thus the amount, of dry cement in hopper 51.

Valve 45, or other suitable regulating device, controls the amount of cement that is delivered to mixing bowl 55. In accordance with conventional techniques, the dry cement is dropped on top of the water being injected through input line 30, at mixing bowl 55. Although not required in the preferred embodiment, a jet nozzle (not shown) may be provided on the input line 30, just upstream from the mixing bowl 55. The cement/water mixture then flows into the mixing chamber 60 where further mixing occurs. Other alternative mixing arrangements can be used, however, without departing from the principles of the present invention.

In the preferred embodiment, the valve 45 comprises a rotary or "star wheel" valve, with a controller 46 that can be externally regulated. The controller 46 of valve 45 preferably connects electrically to the system controller 100 for receiving electrical signals that are used to regulate the speed (or position if the valve is not a rotary valve) of valve 45 in order to control the rate at which dry cement is delivered to the mixing chamber 60. Sensor 47 preferably comprises a star wheel speed sensor for measuring the speed of rotary valve 45. In addition, sensor 47 preferably connects electrically to the system controller 100 to provide an electrical signal to system controller 100 that is indicative of the speed (or position) of valve 45. As will be understood by one skilled in the art, various other valves, controllers and sensors could be used without departing from the principles of the present invention. For example, a slide gate may be used in place of a rotary valve. The position of the slide gate then would be monitored to determine the size of the opening through which cement could pass.

The mixing chamber 60 receives mix water from the input supply line 30 and dry or powdered cement from the dry cement hopper 51, and mixes the water and dry cement to obtain a cement slurry. Other chemicals or additives also may be supplied to the mixing chamber 60, as desired. Mixing chamber 60 preferably includes two divided chambers, Chamber A and Chamber B, to define a weir divider for removing entrained air according to well known principles. Both Chamber A and Chamber B include a mixer for mixing the cement and water.

The mixing chamber 60 preferably is constructed so that the cement and water pour into Chamber A when it is first mixed. As Chamber A becomes full, the slurry pours over into Chamber B. The discharge line 80 preferably connects to the lower side of Chamber B. In the preferred embodiment, a tub level sensor 65 is provided for measuring the slurry level of Chamber B. This tub level sensor 65 preferably comprises a sonic level sensor, and Chamber B is constructed so that it is relatively deep, while having a relatively small cross-section area. Obviously, other dimensions could also be used without departing from the principles of the present invention. By constructing Chamber B with a relatively small cross-section, changes in slurry level in Chamber B will be more pronounced, and thus will be more easily detected by the level sensor 65.

The discharge line 80 preferably receives cement slurry from the lower side of Chamber B and supplies the slurry to the well site. The discharge line 80 includes a discharge flow meter 87 for measuring the rate at which slurry is discharged, a manually controlled discharge pump 82, and a discharge valve 85. In the preferred embodiment, the discharge flow meter 87 comprises a non-intrusive sensor, such as a magnetic flow meter, capable of an accuracy within 0.5%. The discharge flow meter 87 preferably connects electrically to the system controller 100 to provide an output signal that is indicative of the flow rate of cement slurry through discharge line 80. The discharge pump 82 preferably comprises a centrifugal pump that is manually controlled by the operator. One or more triplex pumps 89 also may be provided downstream in the slurry discharge line 80 in accordance with conventional techniques. The triplex pumps are manually regulated by the operator and normally are run at full speed.

The discharge valve 85 works in conjunction with recirculation line 90. When discharge valve 85 is closed, cement slurry is forced to flow through the recirculation line 90. The recirculation line 90 preferably connects between the discharge line 80 and the mixing bowl 55. The recirculation 90 preferably performs two separate functions. First, the recirculation line 90 enables the system to bring the cement slurry to the desired density before discharging begins. Second, during the time cement is being discharged, the amount of slurry recirculated is regulated by the recirculation valve 97. This recirculated slurry adds energy to the mixing process in the mixing bowl 55 and tends to dampen slurry density fluctuations in the mixing chamber 60. The recirculation valve 97 is a throttling type valve and regulates the amount of slurry recirculated. It is used in conjunction with pump 82 speed control to control the discharge pressure in line 80. In the preferred embodiment, a nuclear density meter 95, which preferably has an accuracy within ±0.1 PPG for precisely measuring the density of the cement slurry, is preferably located immediately downstream from pump 82 and before the recirculation line connection.

Alternatively, one skilled in the art will understand that the present invention can be used without a recirculation line or alternatively, no density meter need be included. If no density meter is included, then the density of the cement slurry may still be obtained through the use of the input flow meter and discharge flow meter, as disclosed in parent application, U.S. Ser. No. 07/969,944, the teachings of which are incorporated herein. Alternatively, the density of the slurry may be measured by taking sample readings.

The system controller 100 preferably comprises a microprocessor-based unit for orchestrating the operation of the ACS system. In the preferred embodiment, Motorola's 68HC11 is used as the microprocessor. The controller 100 preferably includes an input, such as a keyboard or operator panel, through which system parameters can be input by an operator. The controller 100 also preferably includes an output for displaying to the operator certain critical system parameters. Preferably, the input and output of the controller 100 are designed so that the operator is guided by a menu driven display to insure that all necessary information is provided by the operator.

Also in the preferred embodiment, the system controller 100 may include one or more read-only memory (ROM) units for storing look-up tables that are loaded into the controller 100 prior to the start of a cement job. These look-up values are used to correlate step rates with error values for both the mix water rate and the dry cement delivery rate. Thus, for example, if the desired mix water rate is different than the actual mix water rate, as measured by input flow meter 37, an error value is calculated by controller 100 based upon the difference. The controller 100 then accesses the look-up table, which preferably is stored on ROM, to determine the appropriate step rate by which the mix water rate should be changed. The step rate, therefore, determines how quickly the rate increases or decreases. A similar look-up table also preferably is used for the dry cement delivery system to determine the step rate of the dry cement. In an alternative embodiment, another look-up table may be provided that correlates the delivery characteristics of the hopper for a given speed (or position) of the valve 45. Thus, by accessing this look-up table, the system controller 100 can approximately determine the quantity of dry cement that will be delivered if the valve operates at a given speed or is set at a particular position. This feature is especially useful if an automatic start-up is desired.

The system controller 100 preferably connects electrically to: (a) the input flow meter 37; (b) the star wheel speed sensor 47; (c) the sonic level sensor 65; (d) the density meter 95; and (e) the discharge flow meter 87, for receiving electrical output signals from each of these sensors. These signals from each of the sensors are processed as described more fully below to permit automatic operation of the ACS.

The system controller 100 also preferably connects electrically to: (a) the fresh water device 35; and (b) the valve controller 46, for providing output control signals to each of these components. The controller automatically adjusts the speed or position of the fresh water device 35 and the valve 45 to fine-tune the density of the slurry, as will be described more fully below.

I. OPERATION OF SYSTEM CONTROLLER

Referring now to FIGS. 2A–2F, the operation of the system controller 100 will be discussed in accordance with the preferred embodiment. In the preferred embodiment, the system controller provides a menu display to the operator to guide the operator through both the main menu and through each step of the options. As shown in FIG. 2, the system controller initially provides three options, as part of a main menu, to the operator: (1) enter job data into the ACS (Job Entry Data); (2) calibrate and set-up the ACS (Cal & Setup); or (3) run the ACS (Run). The source code for the preferred programming of the controller is attached in the Appendix.

1. Entering Job Data

If the operator selects the Job Entry Data selection on the main menu, the controller will ask in step 202 whether the operator wishes to clear all stage data, or whether the operator wishes to edit existing data. It should be understood that the operation of the ACS could include a number of stages, with a stage being defined as any change in operating conditions, including a change in the cement slurry's target density, a change in the density of the input fluid, or a change in the density or type of dry cement that is used. Thus, for example, if it is desired to change from a target slurry of 16.0 PPG to 16.3 PPG, a different stage would be involved. Similarly, if it was desired to add liquid additives to the input water after operations had begun, thus changing the density of the input liquid, a different stage would be defined. Changing from one stage to the next could be preprogrammed into the system controller by, for example, specifying the volume (either input or discharge) at which the stage was to change, or could be done manually by having the operator designate a change in stage by activating a switch. In either instance, the stage parameters could be preprogrammed into the controller.

The first display that will appear to the operator after the stages are cleared, or if the edit option is chosen, is a request, in step 204, to input the desired or target density, preferably in pounds per gallon (PPG), for the cement slurry for that particular stage. As one skilled in the art will realize, other measurement units may be used without departing from the principles of this invention. In the preferred embodiment, an increment and decrement switch is used to set the desired setting. Obviously, other input procedures could be used without departing from the scope of the present invention. After the target density for the cement slurry is entered for a particular stage, the controller prompts the operator in step 206 to enter the specific gravity of the input fluid for that particular stage, again through the use of the increment and decrement switches. The controller next requests information regarding the dry cement specific gravity for that particular stage in step 208.

Once these three items are entered by the operator, the controller in step 210 asks the operator if there are other stages to be entered at this time. If there are, then the controller cycles back through the menus to obtain the necessary information. When all stages have been entered, the controller permits the operator to review the information entered, by stage, and make any necessary changes. When review is complete, the controller returns to the main menu which again is displayed to the operator.

2. Calibrating and Setting Up the System

If the operator selects the Calibrate and Setup option, then the controller will first ask the operator in step 215 if he or she wishes to change the operating parameters or to calibrate the input mix water flow meter. For example, if the input flow meter 37 provides output pulses to signify to the controller 100 that 10 gallons/minute have flowed through the meter, the operator could recalibrate the controller to interpret the 100 pulses from the input flow meter to mean that 10.5 gallons/minute have flowed through the meter. The operator, therefore, can adjust the k factor of the input meter. Similarly, in step 217, the operator also can change the k factor of the discharge meter. This feature enables the various sensors to be pretested and finely tuned for accuracy. In addition, if a new meter is substituted, the meter can be quickly and accurately calibrated through the use of this software option.

In step 219, the controller asks the operator if he or she wishes to change the settings of the valve on the dry cement source. Three different parameters can be changed on the valve. The first parameter that can be changed is the response factor during normal run operations. The response factor represents the gain or amount of change that is used when the dry cement rate must be changed. If a discrepancy exists between the actual and desired rate of which dry cement is supplied, the actual rate must be changed by a certain amount. If the amount of change is excessive and the system is over-correcting, oscillation could occur. Consequently, a gain correction is used which is only a percentage of the difference between desired and actual rates. The second parameter that can be altered is the k factor that represents the interaction between the controller and the k factor permits calibration of the sensor. Lastly, the start-up gain of the valve can be adjusted. The start-up gain is the response factor of the valve during start-up operations, which is similar to the response factor during normal operation. All of these factors can be adjusted to fine tune the operation of the dry cement valve.

The controller also asks the operator if it is necessary to adjust the density meter in step 221. The operator can adjust the controller so that the maximum output from the density meter represents a specific density value. Similarly, the operator can recalibrate the controller so that the lowest output from the density meter represents a zero density value. Thus, for example, if the density meter provides an output that ranges between 0.01 to 0.20 amperes, the controller would correlate the 0.01 amps to a zero density, and would correlate the 0.20 amps to the maximum density value, which might be, for example, 20.0 PPG.

Finally, the controller asks the operator if the mix water response should be readjusted in step 223. The mix water response, like the response factor of the dry cement rate, regulates the gain by which the mix water is adjusted, to prevent over-correction.

3. Run Mode

If the operator selects the Run option off of the Main Menu, the system begins automatic operation. In the preferred embodiment, the Run mode is selected after initialization and startup of the system.

In step 301, the controller calculates the current stare and running parameters, and then displays a screen for the operator. The display screen preferably includes mix water rate, discharge rate, target density, actual density measured by the density meter 95, the stage, the total discharge, the stage discharge, and the time.

After the screen is displayed (or updated), the Controller 100 determines in step 303 if the operator has requested that the system proceed to the next stage. This preferably is done by depressing a preselected switch for a predetermined minimum time. Alternatively, the stage may be changed by a key board entry, or automatically is a predetermined volume of slurry has been discharged.

In step 305, the Controller 100 determines whether the PPG trim feature has been activated and, if activated, determines the amount of trim selected. Next, in step 307, the Controller reads the tub level measured by tub level sensor 65 and scales that measurement to a physical unit (such as feet or inches) for future reference. Similarly, in step 309, the controller reads the density measured by density meter 95 and scales that measurement to a physical unit (such as pounds per gallon or PPG).

In step 310, the controller determines if the automatic density correction feature has been enabled by the operator. In the preferred embodiment, a switch is provided that permits the operator to automatically correct the density through the use of the density meter 95 as a feedback device. In normal operation, the controller maintains the level in slurry in Chamber B constant, and then determines the amount of mix water and dry cement that is being discharged as slurry. These numbers are used to automatically regulate the rate of mix water and dry cement being input to the mixing chamber. In addition to this normal operation, the ACS also has the capability to monitor the actual density of the slurry by means of the density meter 95. According to the preferred embodiment, the operator must select this feature.

If the automatic density correction feature is selected, the controller, as shown in step 311, determines if the actual density measured by the density meter 95 is above or below the target density. If the actual density is higher than the target density, the target density is automatically decreased, which will result in the actual density being decreased as ratios of mix water and dry cement are changed.

Conversely, if the measured density is low, the target density is automatically increased, thus causing the actual density to increase as the ratio of mix water and dry cement change. According to the preferred embodiment, the target density is only increased or decreased each cycle by five percent (5%) of the difference between actual density and target density. This is done to prevent overcompensation and wide fluctuations.

Figure 5:
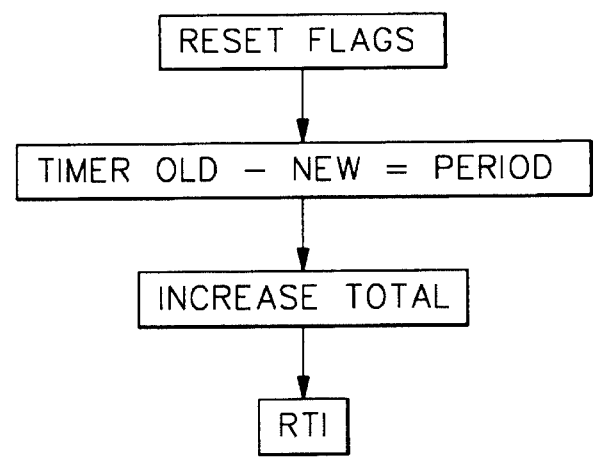
FIG. 5 is a flow chart showing how the rate and total volume of the mix water is generated.

If the automatic density correction is not selected, or if after it is complete, the controller in step 312 determines what the actual mix water rate is into the mixing chamber. To determine the mix water rate, the controller proceeds to the low level interrupt shown in FIG. 5 to gather the period for measurement and the amount of flow. FIG. 5 is a subroutine that measures pulses off of the input flow meter 37 and generates a period and a total. The controller, in step 312 uses the total number of pulses for the period, and determines the amount of flow by referring to the k factor obtained during calibration and set-up for the mix water flow meter. Once the amount of flow and period are ascertained by the controller, the flow is divided by the period to obtain the mix water rate.

Figure 6:
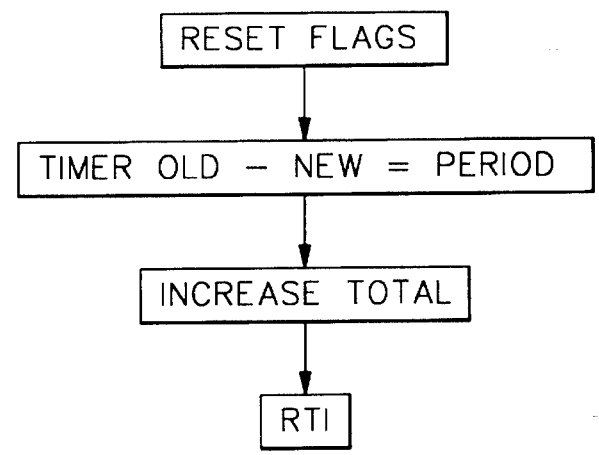
FIG. 6 is a flow chart showing how the rate and total volume of slurry discharged is generated.

In similar fashion in step 313, the controller determines the discharge rate. The controller proceeds to the low level interrupt shown in FIG. 6. FIG. 6 is a subroutine that measures pulses off of the discharge flow meter 87 and generates a period and a total flow. The controller uses the total number of pulses generated by the discharge flow meter for that period, together with the k factor obtained during calibration and set-up for the discharge flow meter, to determine the amount of slurry discharged during the period. The controller then divides the amount of slurry discharged, by the period, to determine the discharge rate.

In step 315, the controller checks to determine if the discharge rate has changed by more than one-half of a barrel in a second. If such a change is detected, the controller reverts to the start-up mode. Next, in step 317, the controller determines if the discharge rate has passed below a minimum threshold. If this occurs, the ACS is shut down.

In step 319, the controller determines the percentage of volume of cement slurry that should be mix water, and then calculates the proper mix water rate. According to the preferred embodiment, the controller determines the percentage of mix water (or fluid) by volume in the cement slurry. This is done by first determining the percentage of dry cement by volume of slurry as follows:

$$\% \text{ VOLUME OF CEMENT} = (\text{SLURRY SG} - \text{FLUID SG})/(\text{CEMENT SG} - \text{FLUID SG}), \quad (1)$$

wherein

SLURRY SG represents the target or desired density of slurry in specific gravity units. This means the target density, which according to the preferred embodiment is entered in pound per gallon (PPG) by the operator in step 204, must be converted by controller into specific gravity units;

FLUID SG represents the density of the input fluid in specific gravity units, as entered by the operator in step 206. Where water is used as the input fluid, this number is 1.0; and CEMENT SG represents the absolute density of the dry cement in specific gravity units, as entered by the operator in step 208.

Once the percentage volume of cement (% VOLUME OF CEMENT) is calculated, the percentage volume of liquid may be easily calculated, as follows:

$$\% \text{ VOLUME OF LIQUID} = 1.00 - \% \text{ VOLUME OF CEMENT.} \quad (2)$$

After the controller determines the % VOLUME OF LIQUID, the controller multiplies this number by the DISCHARGE FLOW RATE to determine the optimal rate at which the input fluid (or mix water) should be supplied to the mixing chamber.

In step 321, after the optimal mix water rate is determined in step 320, this optimal rate is compared with the mix water rate measured in step 312 to determine if the measured mix water rate is less than the optimal rate. If the measured rate is less than the optimal or desired rate, the controller determines if the ACS is in a start-up mode in step 322. Depending on whether the ACS is in a start-up mode, the controller accesses one of two look-up tables—one for start-up mode and one for normal operation. Each of the look-up tables defines a step rate associated with the particular magnitude of error between the measured mix water rate and the desired or optimal mix water rate. Each magnitude of error is associated with a particular step rate in the look-up table. The step rate represents how quickly the mix water rate will be increased or decreased.

For example, if the controller determines in step 321 that the measured mix water rate is 5 gallons per minute less than the optimal rate, the controller, in step 323 or 324 (depending on whether the ACS is in normal operation or start-up), will access a look-up table, determine what step rate is associated with a discrepancy or error of 5 gallons per minute. If the error or discrepancy is very small, the step rate may be zero to reflect no change and to prevent overcompensation. In the preferred embodiment, the look-up is preprogrammed into read only memory ("ROM").

After the controller determines the appropriate step rate is either step 323 or 324, a direction flag is activated to remind the controller that the actual mix water rate must be increased. Conversely, in steps 325, 326, and 327, if the mix water rate is too high, the controller determines the magnitude of the error or discrepancy between measured mix water rate and optimal mix water rate, and determines from the appropriate look-up table what the proper step rate is. After the step rate is determined, the direction flag is activated down to remind the controller that the actual mix water rate must be decreased by the step factor.

Because a separate look-up table is used for the start-up mode and for normal operation, the reaction of the system can be fine-tuned to permit quicker (or slower) response for start-up than would be desired for normal operation. After the appropriate step rate and directional information has been found, it can be stored in step 329. In the preferred embodiment, the information is stored by means of pulse width modulation.

Figure 4:
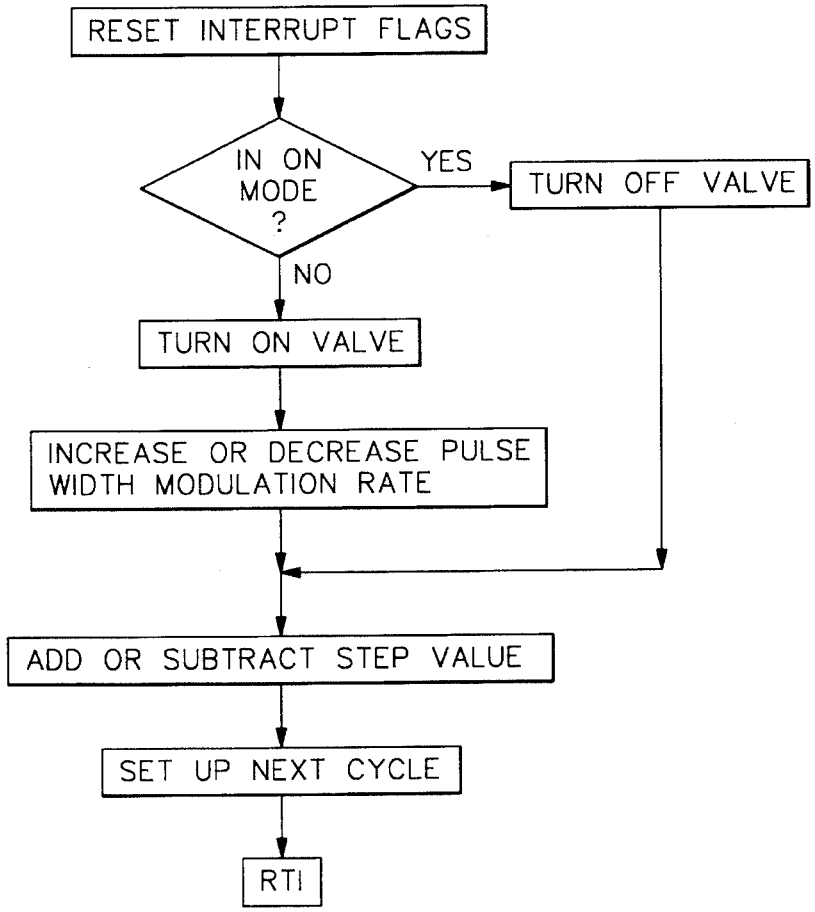
FIG. 4 shows a flow chart of the mix water interrupt for controlling the rate at which fluid is supplied to the mixing chamber of FIG. 1.

The stored step rate and directional information for mix water rate is retained by the interrupt task shown in FIG. 4. In the preferred embodiment, the interrupt of FIG. 4 occurs at a 0.040 second rate. The mix water interrupt determines in step 251 the step rate and directional information. In response, the controller increases or decreases the speed or position of the input water device 35 in accordance with the step rate and directional information.

Figure 7:
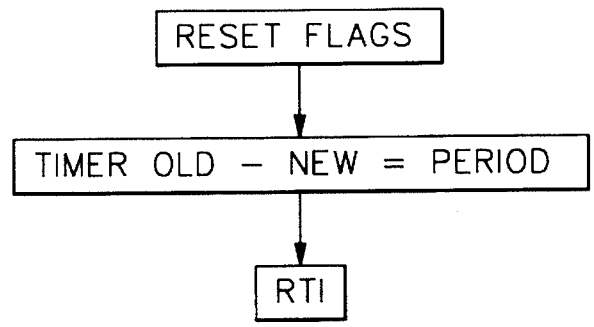
FIG. 7 is a flow chart showing how the rate of the dry cement is generated.

In step 335, the controller obtains the rate at which dry cement is supplied by dry cement source 40. A sensor 47 on the dry cement source 40 generates pulses that are retrieved in the low level interrupt of FIG. 7. The controller converts the pulses into rate information by means of the k factor.

After determining the rate at which dry cement is being introduced into the mixing chamber, the controller determines in step 337 if the system is in the start-up mode and branches accordingly. Regardless of whether the system is in start-up, the controller performs a number of calculations in steps 338, 339 to determine the amount of bulk cement required.

The first calculation performed in steps 338, 339 is to determine the WEIGHT PER CUBIC FOOT OF MIX WATER (or "HO") as follows:

$$HO = 7.4805 * 8.3452984 * WATER\ SG \quad (3)$$

7.4805 represents gallons per cubic foot;

8.3452984 represents pounds per gallon; and

WATER SG is the density of the mix water or input fluid in specific gravity units, as entered by the operator in step 206.

Next, the controller calculates the % of "REAL" DRY CEMENT ("CO") in the total bulk volume of the dry cement, as compared to the percentage of air in the total bulk volume of dry cement, as follows:

$$CO = BULK\ WEIGHT\ OF\ DRY\ CEMENT/(CEMENT\ SG * HO), \quad (4)$$

Where,

BULK WEIGHT OF DRY CEMENT is the weight of dry cement in a sack of cement;

CEMENT SG represents the absolute density of the dry cement in specific gravity units; and HO is the weight per cubic feet of mix water found in calculation (3).

The controller then determines the ABSOLUTE VOLUME OF DRY GALLONS PER MINUTE ("DRY GALLONS MINUTE"), as follows:

*DRY GALLONS MINUTE=CUBIC FEET MINUTE DRY\*7.4805* (5)

Where

CUBIC FEET MINUTE DRY represents the quantity of cubic feet of dry cement added each minute.

Finally, the controller determines the desired rate of dry cement ("DRY DEMAND") to be supplied as follows:

*DRY DEMAND=DISCHARGE FLOW RATE\*% VOLUME OF CEMENT* (6)

Where

DISCHARGE FLOW RATE is the measured discharge flow rate found in step 313; and

% VOLUME OF CEMENT is the percentage of dry cement by volume of slurry, as calculated in step 319.

If the controller determines in step 337 that the ACS was in a start-up mode, the controller branches to path 341. After calculating the rate of dry cement required in step 337, the controller compares this rate with the actual rate determined in step 335. If the controller determines in step 344 that the actual rate at which dry cement is being delivered is lower (or higher) than the desired rate, then the controller branches to step 346 (or step 348) where a step rate is obtained and a directional flag is set. The step rate preferably is found in a look-up table, associated with a particular magnitude of error. Thus, the controller determines the error or discrepancy between the actual dry cement rate and the desired rate, and looks up that error in the look-up table to find the step rate that should be used to correct the actual rate at which dry cement is delivered.

After the step rate is found, the current tub level is stored in memory in step 350. If, conversely, the ACS is not in a start-up mode, then the controller follows branch 342. After determining the desired rate of dry cement to be supplied, the controller in step 360 determines the level in Chamber B. In step 362, the controller compares the level measured in Chamber B with the level stored in memory during start-up (step 350). If a difference exists in tub level, the controller determines the magnitude of the difference in step 363 or 364, and then multiplies the difference by the dry demand found in step 339 to obtain a "tub factor". The tub factor then is either added to or subtracted from the dry demand calculated in step 339 to obtain a modified dry demand that then is used.

Figure 3:
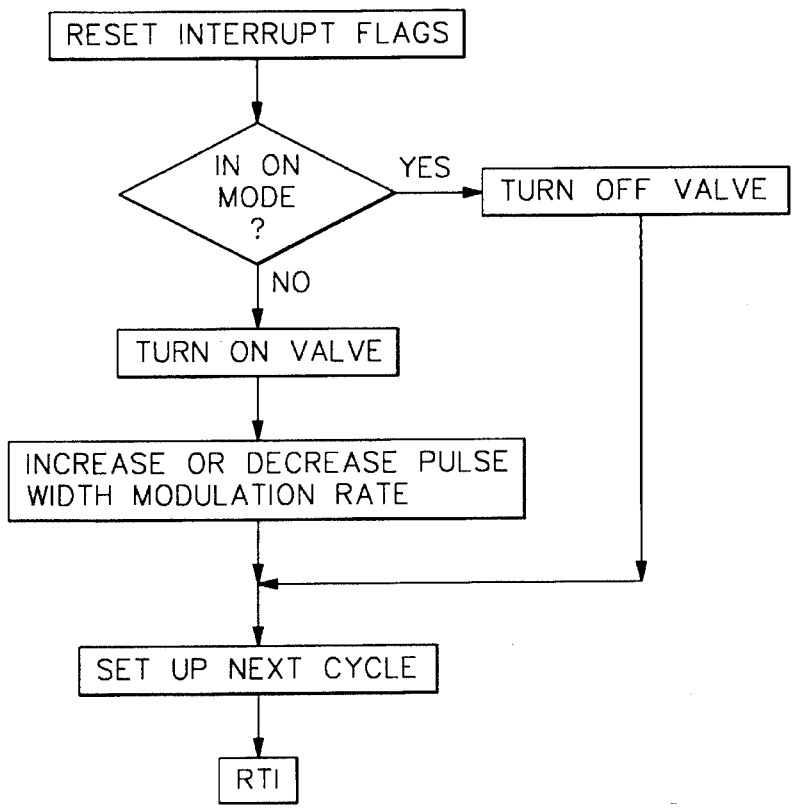
FIG. 3 shows a flow chart of the dry feed interrupt for controlling the valve of the dry cement delivery system of FIG. 1.

Next, in step 370, the controller compares the desired modified rate at which dry cement should be delivered with the actual rate. In steps 371 and 372 the controller determines the appropriate step rate from the look-up table. After the appropriate step rate has been found, the controller in step 375 shows the step rate and directional information, preferably in a pulse width modulated signal. This signal is retrieved in the Dry Feed Interrupt of FIG. 3. As shown in FIG. 3, the speed or position of the dry cement valve is altered according to the step rate and directional rate obtained from step 371 (or step 372). In step 380, the controller determines if the tub is maintaining a constant level and sets the appropriate flags.

II. ACS OPERATION

The operation of the ACS system will now be described with reference to FIG. 1. The operation of the ACS prefer-ably comprises an initialization mode, a start-up mode, a run mode, a trim mode, and a rate variance mode.

A. Cementing Initialization

To initiate the ACS, the operator manually (1) opens the input water valve 36 to permit water to flow into the mixing chamber 60; and (2) adjusts the speed of the rotary valve 45 to regulate the delivery of dry cement into the mixing chamber 60. Because the discharge valve 85 has yet to be opened, the slurry will be forced to recirculate through recirculation line 90. As the slurry flows through recirculation line 90, the density meter 95 measures the density of the slurry. Alternatively, the density can be measured manually by an operator.

Recirculation continues in this manner until two conditions occur: (1) the density measured is the same as the target or desired density, and (2) the level of cement in Chamber B of mixing Chamber 60 lies between the levels marked in FIG. 1 as $x_0$ and $x_1$. At any time prior to starting the run mode, the operator enters into the system controller 100 the following information for each operating stage: (a) the desired or target slurry density; (b) the density of the water or other base liquid being supplied through input line 30; and (c) the density of the dry cement being used.

B. ACS Startup

After the ACS system has been initialized, the operator opens the discharge valve 85 to allow the cement slurry to be discharged through discharge line 80. At this time, the ACS controller 100 receives an output signal from the discharge flow meter 87 indicating that discharge flow has begun. The operator also manually sets the discharge pumps 89 located downstream in the slurry discharge line 80 to operating speed. When the discharge pumps 89 are brought up to operating speed, the level of slurry in Chamber B begins to fall.

Simultaneously, ACS controller 100 regulates the input water rate by adjusting the fresh water positive displacement pump 35 to maintain a constant high precision ratio of input water rate to discharge cement rate. This is done by receiving a signal that represents the rate of flow of cement slurry through the discharge flow meter 87 and by determining the percentage of water by volume in the cement slurry. The controller 100 multiplies the discharge flow rate by the percent of water by volume to determine the amount and rate of water that is being discharged. Once this flow rate of water is determined, the controller 100 adjusts the fresh water pump to this rate. Thus, the controller 100 precisely controls the rate at which water is injected into the mixing chamber 60 so that it is the same as the amount of water that is discharged from the mixing chamber 60 (as part of the slurry). As a result, it is possible to obtain very precise control of the density of the slurry.

According to the preferred embodiment, the controller 100 determines the percentage of water (or liquid) by volume in the cement slurry by first determining the percentage of dry cement by volume in the slurry. The percentage of cement by volume of slurry is calculated as follows:

*% VOLUME OF CEMENT=(SLURRY SG–FLUID SG)/(CEMENT SG–FLUID SG),* wherein

SLURRY SG represents the target or desired density of slurry in specific gravity units. This means the target density, which according to the preferred embodiment, is entered in pound per gallon (PPG) by the operator in step 204, must be converted by controller into specific gravity units;

FLUID SG represents the density of the input fluid in specific gravity units, as entered by the operator in step 206.

Where water is used as the input fluid, this number is 1.0; and

CEMENT SG represents the absolute density of the dry cement in specific gravity units, as entered by the operator in step 208.

Once the percentage volume of cement (% VOLUME OF CEMENT) is calculated, the percentage volume of liquid may be easily calculated, as follows:

*% VOLUME OF LIQUID=1.00–% VOLUME OF CEMENT.*

This equation assumes that only two ingredients are combined to form the slurry—input liquid and dry cement. Additives may be provided as long as they are added to either the dry cement or to the input liquid prior to their introduction to the system.

After the controller 100 calculates the % VOLUME OF LIQUID, the controller 100 multiplies this number by the DISCHARGE FLOW RATE to determine the rate at which the input fluid should be supplied to the mixing chamber 60. The controller then sets the input pump at the proper speed to supply the input liquid at the requisite rate. The controller monitors the output from the input flow meter 37 to adjust the input pump 35 to the proper setting.

For example, if the discharge flow meter indicates that slurry is being discharged at 420 gallons/minute, and the controller determines from the operator inputs that the % VOLUME OF CEMENT is 0.519, then the controller determines that the % VOLUME OF FLUID is 0.481. The controller 100 multiplies the % VOLUME OF LIQUID by the DISCHARGE FLOW RATE, as follows: 0.481×420 gallons/minutes=202 gallons/minute of input liquid. The controller 100 then sets the speed of the fresh water pump 35 at a speed to inject 202 gallons/minute. The input flow meter 37 provides feedback to the controller 100 of the actual rate of liquid being injected into the mixing chamber 60 to permit the controller to readjust the speed of the fresh water pump 35 to precisely control the rate at which liquid is supplied to the mixing chamber 60.

At approximately the same time that the ACS controller 100 is setting the speed of the fresh water pump 35, it also is adjusting the speed of the valve 45. The ACS controller 100, as noted, determines the amount of liquid that must be injected into the mixing chamber 60 to obtain the desired slurry density at the fixed discharge rate. At the same time, the ACS controller 100 also calculates the rate at which the dry cement must be delivered from the source 40 to achieve the desired slurry density.

C. ACS Run Mode

Ideally, if the input flow meter 37 is extremely accurate permitting precise control of the fresh water pump 35, and if the discharge flow meter 87 is equally accurate, and if the valve 45 is delivering cement at the proper rate, so that the amount of dry cement and water being supplied to the mixing chamber 60 exactly equals the amount of cement and water being discharged as slurry, then the level of cement slurry in Chamber B will be fixed and stable, and the actual density of the discharged slurry will equal the desired slurry density input by the operator into the ACS controller 100. In other words, if all meters and valves are completely accurate, the level of slurry in Chamber B will be constant at this time.

If, conversely, the level of cement slurry changes or fluctuates in Chamber B, then the controller assumes there has been a fluctuation in bulk density of the dry cement and modifies its bulk density calculation. The controller then determines how much to change the delivery rate of the dry cement to maintain tub level and proper slurry density. This is explained more fully in the flow chart shown in FIG. 2, and described above. Once the proper rate of dry cement is determined, the position or speed of valve 45 is changed as required.

D. PPG Trim

After the actual and desired slurry density readings are equal, it is common to take a sample of the cement slurry being discharged to test it. Alternatively, another density sensor may be provided downstream in the slurry discharge line. If the density of the sample discharge (or of the second density sensor) does not correspond to the density measured by density meter 95, then the operator can elect to use the ACS PPG Trim mode by pressing an appropriate switch on the control panel (not shown). Activation of this trim switch will be transmitted to the ACS system controller 100, which, in response will cause the ACS to operate in the trim mode. The trim switch permits the operator to manually alter the mix water/dry cement ratio in response to discrepancies between the target density and measured density.

In the trim mode, the controller 100 adjusts the ratio of input water rate to discharge cement slurry rate, which was based upon the percent of water by volume obtained from the calculations relating to the cement slurry discharge. By changing this ratio, the rate at which water is to be supplied to the mixing chamber 60 also will change, as will the rate at which dry cement is delivered to the mixing chamber 60. As a result, the operation of the ACS will revert to the Startup Mode after the ratio of input water rate to discharge slurry rate is changed, and the controller 100 will proceed to determine the proper operating speed or position of the input device 35, based upon the new ratio. After the speed or position of input device 35 is set, then the speed of valve 45 is set to an approximate value based upon desired demand of dry cement. The controller 100 then monitors the output from the level sensor 65 and adjusts the desired dry demand rate until the slurry level in Chamber B remains constant.

E. Discharge Rate Variance

If during ACS operation, the discharge rate changes from its fixed value for any reason, then ACS returns to the Start-up Mode. After detecting a large change in the discharge rate, the controller returns to the start-up mode, where a mix water rate is calculated. The controller 100 sets the input device 35 to the necessary setting so that the amount of water entering through input line 30 equals the amount of water leaving as slurry through the discharge line 80. The input flow meter 37 is used by the controller 100 as part of a closed loop feedback system to precisely set the rate of the device 35. After the mix water input rate is set, the controller then determines the approximate speed of valve 45 that will provide the same amount of dry cement as is leaving as a component of the slurry. The controller 100 monitors the level sensor 65 and adjusts the dry cement rate as necessary to maintain the level of slurry in Chamber B constant.

Operation of the ACS system preferably continues until the total volume of slurry discharged equals the total volume entered by the operator into controller 100 at the beginning of the operation or until the operator indicates that it is time to begin a new stage. The controller 100 keeps track of total volume based upon the signals from the discharge flow meter 87. The controller 100 preferably obtains a signal from the discharge flow meter 87 once every 1/x of a second. Thus, the controller multiplies each rate signal from the discharge flow meter 87 and multiplies that rate by 1/x to obtain a number that represents the total volume of slurry that has been discharged during that sampling period. The controller keeps a running count of the discharged volume by adding each new volume to the total accumulated volume, and compares the new total with the desired total. When the accumulated total equals or is greater than the desired volume, the controller 100 terminates operation and notifies the operator that the job is complete.

While a preferred embodiment of the invention has been disclosed, various modifications can be made to the preferred embodiment without departing from the principles of the present invention.

```
#include <intx811.h>
/*****************************************************************
SA 144143  6-23-93

Automatic Cement Control System 2-8-93      B. Vicknair
*****************************************************************/
#include <stdarg.h>
#include <stdio.h>
#include <io6811.h>
#include <ctype.h>
#include <ioacs.h>
#include <acsio.h>
#include <string.h>
#include <protos.ac>   /*prototyping file*/
/*****************************************************************/
int       d_update=0;
int       testff=0;
int       startup=TRUE;   /* powerup in startup mode */
int       run=FALSE;
float     hl;
int       key_typ;
int       ch;
int       ESC=FALSE;
int       MSG_INX=0;
int       old_msg_type=LABELS+1;/* make a never*/
int       p_ctr=0;        /* print to screen throttle*/
int       update=30;/* update time on recorder on pwrup*/
char      msg_counter2=0x30;/* for 1A -9Z counter*/
char      msg_counter1=0x41;/* msd*/
int       p_ff=0;
char      xtime_temp[16];
int       MSG_TYP=0;
int       CHART_STAT=FALSE;
char      out_buf[MAXC_IN+1];
char      in_buf[MAXC_IN+1];
char      arry[10];
char      t_string[10];
int       buff_index=0;
int       timerflg=0;/*input buffer handelers*/
int       FAIL=FALSE;
int       STAT;
int       COMSFF;
int       HOLD_FLG;
int       STDIN,STDOUT;   /*point getc -putc to proper buffer*/
int       scnt;
int       ptst;
int       seconds;
int       secflag;
int       level_update=FALSE;
int       flow_check=FALSE;
int       timex=FALSE;

int       key_flg;/*.25 sec key switch check flag*/
int       milclok;   /*initialize clocks*/
int       txsec,tsec;    /*below used in RTC routines */
int       txmin,tmin;
int       txhr,thr;
int       tpam;   /*am/pm*/
int       old_sec=0;
int       start_flg=0;
int       direction=UP; /* used with operator entry keys*/
int       cyc_ctr=0; /* recycle ctr to pass to log_scale() */
int       old_direction=DOWN;
int       CH_R_STAT=FALSE; /* used to indicate if TX is in prog on 4856*/
```

```
/*.. meter_data.c*/ unsigned int ic1raw=0;
unsigned int ic2raw=0;
unsigned int ic3raw=0;
unsigned int ic4raw=0;

unsigned long    ic1tot=0;
unsigned long    ic2tot=0;
unsigned long    ic3tot=0;
unsigned long    ic4tot=0;

unsigned int     ic1_old=0;
unsigned int     ic2_old=0;
unsigned int     ic3_old=0;
unsigned int     ic4_old=0;

int      ic1_ctr=0;
int      ic2_ctr=0;
int      ic3_ctr=0;
int      ic4_ctr=0;

unsigned long    ic1temp=0;
unsigned long    ic2temp=0;
unsigned long    ic3temp=0;
unsigned long    ic4temp=0;

int      time_out1=0;
int      time_out2=0;
int      time_out3=0;
int      time_out4=0;

/**/
char    text_arry[31];
/*****************************************************************/

/* below used by utils.c module */
unsigned int start,end,value,last;
unsigned char temp[16];
unsigned char cin,flag;
unsigned char *p;
/*****************************************************************/ float         ftemp=0;        /* used in keys*/
long          ltemp=0;
/*extern               RAMREF;*/
TEXT          _485_str[64];
TEXT          anlog_str[64];
TEXT          count_str[64];
TEXT          tmp_strng[64];
no_init       long           Mix_flowmeter;
no_init       long           Discharge_flowmeter;
no_init       long           Dry_feeder;
no_init       long           Dry_run_response;
no_init       long           Dry_start_response;
no_init       long           density_max;
no_init       long           density_min;
no_init       long           ratio_response;
no_init       int            Stage_touched[9];
no_init       long           Wsq[10];
```

```
no_init      long        usql10;
no_init      int         steps;

no_init      long        k_facts[MAXCHANNELS];    /* rate & tot */
no_init      long        k_factsFS[MAXCHANNELS];  /* rate & tot chart*/
no_init      long        kMIN_analog[MAXCHANNELS];
no_init      long        kMAX_analog[MAXCHANNELS];
no_init      long        k_offset[MAXCHANNELS];
no_init      int         Stages;/* number of programmed stages */
no_init      int         stage_ctr; /*current running stage*/
no_init      int         Auto;
no_init      float       tub_factor;
long         tmp_long;   /*used for atol and others*/
float        data[MAXCHANNELS]; /* processed data during run time */
FILE         cfile[6];   /*make 6 comm files*/
#define      com1        cfile[0]    /*SCI in ,used for floppy storage*/
#define      com2        cfile[1]    /*SCI out, 9600 baud*/
#define      com3        cfile[2]    /* io485 in 9600 during test*/
#define      com4        cfile[3]    /* io485 out */
#define      com5        cfile[4]    /* LCD out,2400 baud*/
#define      com6        cfile[5]    /* LCD in (not used)*/

/*                          1234567890123456789012345678901234567890*/
#define      msg_1a      "^\x11%c%c     Stewart & Stevenson Services Inc.  "
#define      msg_1b      "^\x11%c%c            Petroleum Division           "
#define      msg_1c      "^\x11%c%cAutomatic Cement Control System (c) 1993"
#define      msg_1d      "^\x11%c%c    Serial# 000ACS1    Model 144143     "

/*********************** MAIN ***********************/
void main(void)
        {
/*
Mix_flowmeter=30001;
Discharge_flowmeter=30001;
Dry_feeder=80001;
Dry_run_response=10001;
Dry_start_response=10001;
density_max=220001;
density_min=80001;
kMIN_analog[DENSITY_CH]=80001;
kMAX_analog[DENSITY_CH]=220001;
k_offset[DENSITY_CH]=8201;
ratio_response=10001;
clear_job_data();
*/
        if((tub_factor>.25) || (tub_factor<0)) tub_factor=.001;

init_io();     /* via & dac init */
        set_sens();    /* input capture sensitivity */

CHART_STAT=FALSE;/* that function will control*/
        buffint();     /*initialize comm buffers and flags*/ enable_interrupt();
        while (seconds <= 2)    /*bootup delay*/
                {;}
        init_msg(); /*  just a simple logon message*/
        while (seconds <= 4)    /* delay for lcd */
                {;}
        start_flg=1;
        RTC_EN= 0x40;/* make sure clock is running*/
                while(TRUE==TRUE)     /*always loop here*/
                        {
        select_screen();
```

```
main_fiesta/
/*      error_trap();    should not get here*/
        }
/**************************************************************************/ void buffint(void)
        {
        com1._fd = 1;     /*initialize file descriptors*/
        com2._fd = 2;
        com3._fd = 3;
        com4._fd = 4;
        com5._fd = 5;
        com6._fd = 6;

com1.status = NULL;     /*initialize status*/
        com2.status = NULL;
        com3.status = NULL;
        com4.status = NULL;
        com5.status = NULL;
        com6.status = NULL;

com2.flag = NULL;
        com4.flag = NULL;
        com5.flag = NULL;

com1.flag = EOF;        /*initialize flag*/
        com3.flag = EOF;
        com6.flag = EOF;        /* lcd in */ com1.nextc = com1.base = &com1.cbuff[0];        /*SCI in*/
        com2.nextc = com2.base = &com2.cbuff[0];        /*SCI out*/
        com3.nextc = com3.base = &com3.cbuff[0];        /* ANL in*/
        com4.nextc = com4.base = &com4.cbuff[0];        /* ANL out*/
        com5.nextc = com5.base = &com5.cbuff[0];        /* LCD out*/
        com6.nextc = com6.base = &com6.cbuff[0];        /* LCD in */
        }

/**************************************************************************/
void    flushb(int tp1)         /*flush com buffer*/
        {
        int     outstd = STDOUT;
        int     instd  = STDIN;

switch(tp1){
                case 1:                         /*SCI IN */
                        disable_interrupt();
                        com1.flag = EOF;
                        com1.status = NULL;
                        com1.nextc = com1.base = &com1.cbuff[0];
                        enable_interrupt();
                        break;
                case 2:                         /*SCI OUT*/
                        disable_interrupt();
                        com2.flag = NULL;
                        com2.status = NULL;
                        com2.nextc = com2.base = &com2.cbuff[0];
                        enable_interrupt();
                        break;
                case 3:                         /* RS485 ANA IN*/
                        disable_interrupt();
                        com3.flag = EOF;
                        com3.status = NULL;
                        com3.nextc = com3.base = &com3.cbuff[0];
```

```
                            break;
            case 4:                         /* RS485 ANA OUT*/
                    disable_interrupt();
                    com4.flag = NULL;
                    com4.status = NULL;
                    com4.nextc = com4.base = &com4.cbuff[0];
                    enable_interrupt();
                    break;
            case 5:             /* LCD OUT*/
                    disable_interrupt();
                    com5.flag = NULL;
                    com5.status = NULL;
                    com5.nextc = com5.base = &com5.cbuff[0];
                    enable_interrupt();
                    break;
            default:                        /* LCD IN*/
                    disable_interrupt();
                    com6.flag = NULL;
                    com6.status = NULL;
                    com6.nextc = com6.base = &com6.cbuff[0];
                    enable_interrupt();
                    break;

}
        STDOUT = outstd;
        STDIN  = instd;
}

/****************************************************************************/
void    bufout(void) /* called from timer int */
        { if (com2.status == _WFLAG) {            /*SCI transmit*/
                if ((SCSR & TXRDY1) == TXRDY1)
                    SCDR = *com2.nextc++; /*output char & point to next char*/
                if (com2.nextc >= (com2.cbuff+BUFSIZ))/*TEST-point past buff?*/
                    com2.nextc = &com2.cbuff[0]; /* repoint to begin of buffer*/
                }
        if (com2.nextc == com2.base) {          /* -buffer empty*/
                com2.flag = NULL;               /*make flag NULL*/
                com2.status = NULL;     /*if yes - reset status*/
                } if (com4.status == _WFLAG) {            /*RS485 transmit*/
                if ((ANAST & TXRDY_A) == TXRDY_A)/*tx buff empty?*/
                {
                /*turn off the rx and on the transmitter*/
                PORT6C= 0x04; /* rx off */
                PORT6C= 0x01; /*set bit 0, cha enbs*/
                ANARW = *com4.nextc++;/*output char & point to nextc*/
                }
                if (com4.nextc >= (com4.cbuff+BUFSIZ))/*TEST-point past buff?*/
                    com4.nextc = &com4.cbuff[0];/* repoint to begin of buffer*/
                }
        if (com4.nextc == com4.base) {                  /* -buffer empty*/
                com4.flag = NULL;       /*make flag NULL*/
                com4.status = NULL;     /*if yes - reset status*/
                } if (com5.status == _WFLAG)
        {       /* LCD  RS 485 transmit*/
```

```
                DB_CRB=WAKE; turn on tx,turn off rx first*/
                PORTGC= 0x08; /* turn off rx */.
                PORTGC= 0x02; /*set bit 1, chb lcd 485 en,rx disable*/
                DISRW = *com5.nextc++;  /*output char & pt to nextc*/
                COM5FF=0;                       /*RESET FLIP FLOP*/
        /*      DB_CRB=SLEEP;   auto turn off*/
                }
                if (com5.nextc >= (com5.cbuff+BUFSIZ))/*TEST-point past buff?*/
                 com5.nextc = &com5.cbuff[0]; /*  repoint to begin of buffer*/
                }
                /*if (COM5FF >=9 )
                        COM5FF=0;*/
                COM5FF++;
        if (com5.nextc == com5.base) {              /* -buffer empty*/
                com5.flag = NULL;                   /*make flag NULL*/
                com5.status = NULL;                 /*if yes - reset status*/

}
  if ((DIST & TXRDY_B) == TXRDY_B)/* tx shft reg empty*/
                {
                PORTGS=0x02;/* then turn off the tx ,rx on seperate,no glitch*/
                PORTGS=0x08;
                }
  if ((ANAST & TXRDY_A) == TXRDY_A)/*tx buff empty?*/
                {
                PORTGS=0x01; /* turn off io485 line*/
                PORTGS=0x04; /* turn on rx */
                }
/*      if(testff==0){PORTGS=0x10;testff=1;}   test
        else {PORTGC=0x10; testff=0;}*/
}
/******************** VECTOR ROUTINES ********************************/
/*
This routine is called on interrupt -IRQ.
It put the received char in the buffer and sets the pointers
*/
void vecirq(void)
        {
/*first check int flg and see if it is tx complete signal*/
        TEXT            c;
        c = ANAST;                              /*clear int flag*/
        c = ANARW;
        if (c == '\r')          /*read data from duart port*/
                *com3.base++ = '\0';    /*end of string delim*/
        else
                *com3.base++ = c;       /*store char*/
        if (com3.base >= (com3.cbuff + BUFSIZ))
                com3.base = &com3.cbuff[0];
        if (com3.base == com3.nextc)
                ;
        com3.flag = _RFLAG;     /*set flag to show data has been read*/
}
/***********************************************************************/
/*
This routine is called on interrupt -SCI.
It put the received char in the buffer and sets the pointers
*/
void vecsci(void)
        {
        TEXT            c;
        c = SCSR;
        c = SCDR;               /*read data from SCI port*/
        if (c == '\r')
        *com1.base++ = '\0';    /*end of string delim*/
```

```c
                Acmui.besch1 = 0;                              /* store char*/
        if (com1.base >= (com1.cbuff +BUFSIZ))
                com1.base = com1.cbuff;
        if (com1.base == com1.nextc)
                ;
        com1.flag = _RFLAG;    /*set flag to show data has been read*/
}
/********************************************************************/
void    nulfunc(void)
        {
        ;
        }
/********************************************************************/
void    vectoc2(void)
#define timsk1  0x40                    /*timer interrupt flag reset value */
#define coprst  (*(char *)0x703A)       /*COP time out register*/
#define led     (*(char *)0x7ffe)
#define COPA    0x55
#define COPB    0xAA
        {

TFLG1 = timsk1;                         /*resets enable*/
        TOC2  = (CINTIME + TCNT);               /* resets timer */ if(++milclok >= QUARTER_SEC)
        {       /*incs SYS clock  & chks if .X sec*/
                milclok = 0;
                key_flg = TRUE;
                timex=TRUE; /* screen time update */
                if(++scnt >= 4)
                {                       /*TEST - one second?*/
                        scnt = 0;
                        secflag = TRUE;
                        level_update=TRUE;/* flag for level ctl */
                        d_update++;
                        flow_check=TRUE;/* check .5bbl chg/sec*/
                        if(startup==TRUE)/* while inc seconds, check start up */
                        {
                                if(seconds<START_MODE){;}
                                        /* start up always less than 60 sec */
                                        else {startup=FALSE;}
                        }
                        if(++seconds >= 60)
                        {
                                seconds =0;

}
                }
        }
        time_out1++;/* input capture time outs*/
        time_out2++;
        time_out3++;
        time_out4++;
        bufout();       /*output a buffer char at least every .004 sec*/
        coprst = COPA;          /*write to COP*/
        coprst = COPB;          /*write to COP*/

}
/********************************************************************/ int     atoi(const TEXT *nptr)
        {
        register        int     num;
        unsigned        char    sig;
```

```c
                ++nptr;
        sig = (*nptr == '+' || *nptr == '-') ? (*nptr++ == '-') : NO;
        for(num = 0; isdigit(*nptr);++nptr)
                num = num * 10 + (*nptr - '0');
        return((sig) ? -num : num);
}

/*******************************************************************/
int     putc(TEXT x,int stdout) /*get char from data stream,
                                  x=char to be outputed
        stdout=buffer to be operated on */
        {
FILE    *fp;

fp = cfile +stdout;     /*get correct file to work on &
                                  see if buff is full*/
        while(fp->flag ==EOF)
                ;
        *fp->base++ = x;        /*get char and put into buffer increment base
                                  pointer*/
        fp->status = _WFLAG;    /*set buf written flag*/
        if (fp->base >= (fp->cbuff+BUFSIZ))  /*TEST-point past buff?*/
                fp->base = fp->cbuff;        /*repoint to begin of buffer*/
        if (fp->base == fp->nextc)           /*TEST -buffer full?*/
                fp->flag = EOF;              /*make flag EOF*/
        return(NULL);
}
/*******************************************************************/
int     getc(int p)     /*get char from data stream.
                          p=usually what ever STDIN is*/

{
        FILE    *fp;
        TEXT    c;      /*character returned by function*/ fp = cfile +p;                  /*get correct file to work on &
                        check to see if buffer has been written to.*/
        if (fp->flag == _RFLAG) {
                c = *fp->nextc++;       /*put char from buff
                        into c & inc nextc pointer*/
                if (fp->nextc >= (fp->cbuff + BUFSIZ))     /*TEST-point
                                                             past buff?*/
                        fp->nextc = fp->cbuff; /*repoint to begin of buffer*/
                if (fp->base == fp->nextc) /*TEST -buffer empty?*/
                        fp->flag = EOF;    /*make flag EOF*/
                        return(c);
        } else
                return(EOF);            /*return an eof char if empty*/
}
/*******************************************************************/
int getchar(void)
        {
        return(getc(STDIN));
        }
/*******************************************************************/
int putchar(char c)
        {
        return(putc(c,STDOUT));
        }
/*******************************************************************/
void    init_msg(void)
        {
        STDOUT = comm5; /* lcd  */
        printf(CLRSCRN);
        printf(CUROFF);
        printf(msg_1a.1.1);
```

```c
        printf(msg_ld,4,2);
        printf(msg_ld,4,1);
        }
/*******************************************************************/

/*******************************************************************/
/* read time */
time()
        {
        int     stdout,stdin;
        stdin=STDIN; /* save calling status*/
        stdout=STDOUT;
        STDOUT = comm5; /* lcd*/
        CTL = STOP;     /* stop(freeze) time,background still runs*/
        tsec =SEC;
        tmin = MIN;
        thr = (HOUR & HR_MASK);
/* now see if to proceed */
        if(tsec == old_sec)
                        { CTL = RUN;
                        STDOUT=stdout;
                        STDIN=stdin;
                        return;
                        }
             CTL = RUN;        /*let it run */
        old_sec = tsec; /* update for next*/
        txsec=tsec=bcdbin(tsec); /*convert bcd to bin"int"*/
        txmin=tmin=bcdbin(tmin);
        txhr=thr=bcdbin(thr);/* t"x" functins for recorder print*/
        tpam = (PAM & TODR); /*read and mask am/pm*/

/* now print to display */
/*               12345678901234567890123456789012345678908*/
/*                                        00:00:00 AM*/
        printf("~\x11%c%c:",4,32);
        printf("~\x11%c%c:",4,35);      /* print collons*/
        if(((char)tpam)==0)
                        printf("~\x11%c%c AM",4,38);
/* then must be PM*/
        else
                        printf("~\x11%c%c PM",4,38);
/*         */
/* now output hour with pad if necessary */
        if(thr <10)     {
                printf("~\x11%c%c0",4,30);
                printf("~\x11%c%c%1d",4,31,((char)thr));
                }
        else
          printf("~\x11%c%c%2d",4,30,thr);

/* now output min with pad if necessary */
        if(tmin <10)    {
                printf("~\x11%c%c0",4,33);
                printf("~\x11%c%c%1d",4,34,((char)tmin));
                }
        else
          printf("~\x11%c%c%2d",4,33,tmin);
/* now output sec with pad if necessary */
        if(tsec <10)    {
                printf("~\x11%c%c0",4,36);
                printf("~\x11%c%c%1d",4,37,((char)tsec));
                }
        else
          printf("~\x11%c%c%2d",4,36,tsec);
update++;/* chart recorder */
```

```
            if(update==UPDATE)
            (/*     print_time();*/
                    update=0;)

STDOUT=stdout;
    STDIN=stdin;
    }
/**********************************************************************/ set_time() /* test*/

{
int     STDOUT =comm5; /* lcd */
int     cursor_x=31;
int     cursor_y=3;
int     fcount=31;
int     key_typ;
int     acp_flg = FALSE;
int     exit=FALSE;
int     tmask,temp;
        printf(CLRSCRN);

/* increment changes cursor location,dec changes time par*/
                printf("~\x11%c%cv",3,((char)fcount)); /*inital set up*/
  /*            1234567890123456789012345678901234567890*/
  /*                            00:00:00 AM*/
printf("~\x11%c%c----------------Set Time----------------",1,1);
        printf("~\x11%c%cUse INC to move cursor",2,4);
        printf("~\x11%c%cUse DEC to change time",3,4);
        printf("~\x11%c%cAccept to Exit",4,4);
        while (acp_flg == FALSE)
        {
                time();
                    key_typ = key_chk();
                        if(key_typ == 4){       /* increment */
                            {
                    printf("~\x11%c%c ",3,((char)fcount));/*clear previous*/
                                    fcount=fcount+3;
                                    if( fcount >= 41)
                                            fcount = 31;
                                    }
                    printf("~\x11%c%cv",3,((char)fcount)); /*write new*/
                                    twd_clr();
                                    }

/*test*/
                                if(key_typ == 3)
                                    {
        time(); /*update regs*/
        CTL =STOP; /*stop the regs*/

/* decrement actually changes the time*/
                if(fcount==31) /*then do hour*/
                    {
/*      tpam = (PAM & TODR); read and mask am/pm*/
        tmask=(HOUR & 0x0060); /* mask out ampm and ampm flg*/
        temp = (HOUR & HR_MASK);/* now just get hour*/
        temp= bcdbin(temp);
        temp--;
                if(temp> 12) /* really an error cond including ff rollover*/
                        temp=12; /*correct for overflow*/
                if(temp <1)
                        temp=12;
                temp= binbcd(temp);
        HOUR = (  ((char)temp)  |  ((char)tmask)  );/* reconstruct */
```

```c
old_sec=-1;/* force update*/
CTL=RUN;
hlt_key();
                            time();
                            } if(fcount==34) /*then do min*/
                    {
temp = MIN; /* in bcd*/
CTL=RUN;
temp= bcdbin(temp);

temp = (temp-1);
        if(temp>59)
                temp=0; /*correct for overflow*/
        if(temp<0)
                temp=59;
temp=binbcd(temp);

MIN = ((char)temp);
old_sec=-1;/* force update*/
hlt_key(); /* test */
                            time();
                            } if(fcount==37) /*then do second*/
                    {
temp = SEC; /* in bcd*/
CTL=RUN;
temp= bcdbin(temp);
temp = (temp-1);
        if(temp>59)
                temp=0; /*correct for overflow*/
        if(temp<0)
                temp=59;
temp=binbcd(temp);
SEC = ((char)temp);
old_sec=-1;/* force update*/
qtr_key(); /* test */
                            time();
                            } if(fcount==40) /*then ampm toggle*/
                    {
tmask=0;
temp= (HOUR & 0xdf); /* pre clear ampm*/
tmask = (PAM & TODR); /*read and mask am/pm*/
        if(tmask==0)/* was in am*/
                tmask=0x20;
        else
                tmask=0;
HOUR = (  ((char)temp)  |  ((char)tmask)  );/* reconstruct */
HOUR = (HOUR | 0x40); /* make sure in 12 hour format*/
old_sec=-1;/* force update*/
CTL=RUN;
rev_clr();
                            time();
                            }
        }
        /* now check accept */
                                    if(key_typ == 1){
                                    time();
                                    acp_flg = TRUE;
                                    acp_clr();
```

```
            return;
        }
/**********************************************************************/ int     bcdbin(passed)  /* convert the passed int(BCD) to hex_bin*/
        {               /* no error check and #must be >99 */
        int     num_tmp = 0;
unsigned char op = 0;
        int *point;
 point = &passed;
        op = ((*point) & 0x0f);/* mask lo nyb*/
        num_tmp = op;           /* save lo nibble*/
        op = ((*point) & 0xf0);/* mask hi nyb*/
        op= (op/16); /* shift right 4 places*/
        op= (op*10); /*adjust*/
        op= (op & 0x00ff); /* make sure*/
        return(passed=(num_tmp+op));
        }
/**********************************************************************/
```

```c
void get_idecione(float);
/*#include <int6811.h>
**********************************************************************
acsl.c
select cal ,job entry and misc get_text()              get an index from nvram
sto_text()              put an index in nvram
**********************************************************************/
#include <stdarg.h>
#include <stdio.h>
#include <io6811.h>
#include <ctype.h>
#include <ioacs.h>
#include <acsio.h>
#include <string.h>
#include <protos.acs>  /*prototyping file*/
/**********************************************************************/
int escapex=FALSE;
        extern          int             Auto;
        extern          long            density_max;
        extern          long            density_min;
        extern          long            ratio_response;
        extern          long            Mix_flowmeter;
        extern          long            Discharge_flowmeter;
        extern          long            Dry_feeder;
        extern          long            Dry_run_response;
        extern          long            Dry_start_response;
        extern          int             key_typ;
        extern          float           ftemp;
        extern          int             ch;
        extern          long            ltemp;
        extern          int             cyc_ctr;
        extern          int             FAIL;
        extern          int             direction;
        extern unsigned char temp[16];
        extern          char            out_buf[MAXC_IN+1];
        extern          STDIN,STDOUT;   /*point getc -putc to proper buffer*/
        extern          int             scnt;
        extern          int             btst;
        extern          int             seconds;
        extern          int             secflag;
        extern          int             key_flg;/*.25 sec key switch check flag*/
        extern          int             milclok; /*initialize clocks*/
        extern          int             timex;
        extern          int             tsec;   /*below used in RTC routines */
        extern          int             tmin;
        extern          int             thr;
        extern          int             tpam;   /*am/pm*/
        extern          int             old_sec;
        extern          int             start_flg;
        /*extern                int             RAMREF;*/
        extern          int             STA1;
        /*extern         TEXT            stra0[64];*/
        extern          TEXT            anlog_str[64];
        extern          TEXT            count_str[64];
        extern          TEXT            tmp_strng[64];
        extern          long            k_facts[MAXCHANNELS];
        extern          long            k_factsFS[MAXCHANNELS];
        extern          long            KMIN_analog[MAXCHANNELS];
        extern          long            KMAX_analog[MAXCHANNELS];
        extern          long            k_offset[MAXCHANNELS];
        extern          long            tmp_long;       /*used for atol and others*/
```

```
/*extern       char      cfile[];*/
#define    com1    cfile[0]     /*SC1 in ,used for floppy storage*/
#define    com2    cfile[1]     /*SC1 out, 9600 baud*/
#define    com3    cfile[2]     /* io485 in 9600 during test*/
#define    com4    cfile[3]     /* io485 out */
#define    com5    cfile[4]     /* LCD out,2400 baud*/
#define    com6    cfile[5]     /* LCD in (not used)*/
/**************************************************************/
        select_screen()/*select RUN,Clear Totals,or CALIBRATION/SELF-TEST*/
{
int     STDOUT =comm5;  /* lcd */
int     cursor_x=10;
int     cursor_y=2;
int     fcount=2;
int     key_typ;
int     acp_flg = FALSE;
/*  */
        printf(CLRSCRN);
/*             1234567890123456789012345678901234567890*/
printf("~\x11%c%c-----------Automatic Cementer-----------",1,1);
        printf("~\x11%c%cJob Data Entry",2,12);
        printf("~\x11%c%cRun ACS",3,12);
        printf("~\x11%c%cCalibration/Setup",4,12);
        printf("~\x11%c%c>",((char)cursor_y),((char)cursor_x));
        while (acp_flg == FALSE)
        {
        if(timex==TRUE){time();  timex=FALSE;}/*keep time on screen*/
                key_typ = key_chk();
                        if(key_typ == 4){         /* increment */
                        {
                        printf("~\x11%c%c ",((char)fcount),10);/*clear previous*/
                                fcount=fcount+1;
                                if( fcount >= 5)
                                        fcount = 2;
                        }
                        printf("~\x11%c%c>",((char)fcount),10); /*write new*/
                                fwd_clr();
                        } if(key_typ == 3){         /* decrement */
                        {
                        printf("~\x11%c%c ",((char)fcount),10);/*clear previous*/
                                fcount--;
                                if( fcount < 2)
                                        fcount = 4;
                        }
                        printf("~\x11%c%c>",((char)fcount),10); /*write new*/
                                rev_clr();
                        }
                                             /* now check accept */
                        if(key_typ == 1){
                                acp_flg = TRUE;
                                acp_clr();
                        }
        } switch (fcount){
                        case 2:
                                job_data();
                                break;
                        case 3:
                                run_acs();
                                break;
                        case 4:
                                setup();
```

```
                default:
                        job_data();
                        break;
                }
}
/*******************************************************************/ setup() /*select
            "Zero Density Meter"
            "Install/Modify K Factors"
            "Set Time"
        */

{
int     STDOUT =comm5; /* lcd */
int     cursor_x=6; /* inital cursor positions*/
int     cursor_y=2;
int     fcount=2;
int     key_typ;
int     acp_flg = FALSE;
escapex=FALSE;
/*      */
        printf(CLRSCRN);
/*              12345678901234567890123456789012345678 90*/
printf("~\x11%c%c_____Select Function_____",1,1);
        printf("~\x11%c%cOffset Density Meter",2,8);
        printf("~\x11%c%cInstall/Modify k Factors",3,8);
        printf("~\x11%c%cSet Time",4,8);

printf("~\x11%c%c>",((char)cursor_y),((char)cursor_x));
        while (acp_flg == FALSE)
        {
        if(timex==TRUE){time();  timex=FALSE;}/*keep time on screen*/
                        key_typ = key_chk();
                                if(key_typ == 4){       /* increment */
                                {
                        printf("~\x11%c%c ",((char)fcount),6);/*clear previous*/
                                        fcount=fcount+1;
                                        if( fcount >= 5)
                                                fcount = 2;
                                }
                        printf("~\x11%c%c>",((char)fcount),6); /*write new*/
                                fwd_clr();
                                }
/*******************************************************************/
                                if(key_typ == 3){       /* decrement */
                                {
                        printf("~\x11%c%c ",((char)fcount),6);/*clear previous*/
                                        fcount--;
                                        if( fcount < 2)
                                                fcount = 4;
                                }
                        printf("~\x11%c%c>",((char)fcount),6); /*write new*/
                                rev_clr();
                                }
                                        /* now check accept */
                                if(key_typ == 1){
                                        acp_flg = TRUE;
                                        acp_clr();

}
                if(key_typ==2) return;
        }
                switch (fcount){
```

```
                    case 2:
                            zero_density();
                            break;
                    case 3:
                            k_factors();
                            break;
                    case 4:
                            set_time();
                            break;
                    default:
                            zero_density();
                            break;
                    }
}

/*******************************************************************/

/* zery_density meter calls 4-20 loop read and scales, displays, asks to cho*/ zero_density()
        {
        ch=DENSITY_CH;
        offset();
        }
/*******************************************************************/
/* "offset" adds or subtracts up to 3k relative points from a binary array
used during run time for offset , this routine will be called during
run time and will display calculated real units . It is also called
in the set up screen displaying only the offset */

/* ftemp global is used for printf only. */
 offset()
        {
                                        /* first display old value*/
        int     acp_flg=FALSE;
        int     key_typ,temp;
        cyc_ctr=0;
                printf(CLRSCRN);
                /*xxxxxx1.xxx */
        if(k_offset[ch]>MAX_OFFSET)
                        {
                        k_offset[ch]=MAX_OFFSET; /*set to MAX*/
                        }
        if(k_offset[ch]<0)
                        {
                        k_offset[ch]=0; /*set to min*/
                        }
        ltemp=k_offset[ch];/* load temp reg*/
/*               12345678901234567890123456789012345678890*/
        printf("\x11%c%c  Use INC/DEC to change Density Reading ",1,1);
        printf("\x11%c%c           Press ESC to exit.          ",2,1);

acp_flg=FALSE; /* preset*/ z_func(ch); /* display current value */ while(acp_flg==FALSE)
                        {
        if(timex==TRUE)                         {
                time();  timex=FALSE;/*keep time on screen*/
/*              temp=do_a_d(DENSITY_CH);*/
/*              printf("\x11%c%cInt A/D=  %4d        ",2,10,temp);*/
                                        }
                        key_typ=key_chk();
                                if(key_typ == 1) /* then normal exit*/
```

```
                                acq_flg=TRUE;
                                acp_clr();
                                }
                        if(key_typ == 2) /* then hard exit screen*/
                                {
                                esc_clr();
                                return;
                                }
                        if(key_typ == 3) /*inc k fac*/
                                {
                                direction=UP; /*increment*/
                        log_scale();/* scale the long and update ftemp*/
        if(ltemp>MAX_OFFSET)
                ltemp=MAX_OFFSET; /*set to MAX*/
        if(ltemp<0)
                ltemp=0; /*set to min*/
        k_offset[ch]=ltemp;
                        printf("^\x11%c%cNew OS %4ld   ",4,1,ltemp);
                                cyc_ctr++;
                                qtr_key();
                        z_func(ch); /* get a/d data and scale, redisplay */
                                }
                /*check dec*/
                        if(key_typ == 4) /*dec k factor */
                                {
                                direction=DOWN;
                        log_scale();/* flt,int*/
        if(ltemp>MAX_OFFSET)
                ltemp=MAX_OFFSET; /*set to MAX*/
        if(ltemp<0)
                ltemp=0; /*set to min*/
        k_offset[ch]=ltemp;
                        printf("^\x11%c%cNew OS %4ld   ",4,1,ltemp);
                                cyc_ctr++;
                                qtr_key();
                        z_func(ch);/* see if offset to be displayed*/
                                }
                        if(key_typ==FALSE)
                                cyc_ctr=0;/* after key is released clear ctr*/
                        }
/* at this point the new k has been selected and will be stored if ok*/
                k_offset[ch]=ltemp;
}

/**********************************************************************/
 z_func(ch_m)
{
        int     stdout,stdin;
        long    konstant;
int     func,temp;
int     voltage;
int     current;
        long    wk1;
        float   wk2;
        float   k_span,mul,min; /* for zero and span*/
 stdout=STDOUT;
 stdin=STDIN;
STDOUT=comm5; /* lcd*/ k_span=(float)kMAX_analog[ch_m]-(float)kMIN_analog[ch_m];
                mul=k_span/((ADBIT-(float)k_offset[ch_m]));/*auto scale*/
                min=(float)kMIN_analog[ch_m]/1000;/*get scale offset adder */
                current=(do_a_d(ch_m)) - k_offset[ch_m];
```

```
                        if(current<0)
                                current=0; /* */
                wk2=(((float)current*mul)/1000) + min;/* scale and add display offset*/
                        printf("^\x11%c%cSample density reading = %3.3f ",3,5,wk2);
STDOUT=stdout;
STDIN=stdin;
}

/****************************************************************************/ k_factors()
{
int     STDOUT =comm5; /* lcd */
int     cursor_x=6; /* inital cursor positions*/
int     cursor_y=2;
int     fcount=1;
int     key_typ;
int     acp_flo = FALSE;
 escapex=FALSE;
/*      */
        printf(CLRSCRN);

/*                      12345678901234567890123456789012345678901234567890*/
        printf("^\x11%c%c    Density Meter Feedback Control        ",1,1);
        printf("^\x11%c%c           Enabled  >        ",2,1);
        printf("^\x11%c%c        INC DEC to Change    ",4,1);
        if(Auto==ON)
                printf("^\x11%c%cYes  ",2,25);
                else    printf("^\x11%c%cNo    ",2,25);
        while( key_chk() != 1)
                {
                        key_typ=key_chk();
                                if(key_typ==2) {return;}
                                if( (key_typ==3) || (key_typ==4) )
                                        {
                                                if(Auto==ON) Auto=OFF;
                                                else Auto=ON;
                                if(Auto==ON) printf("^\x11%c%cYes  ",2,25);
                                        else printf("^\x11%c%cNo   ",2,25);
                                        fwd_clr();
                                        rev_clr();
                                        hlf_key();
                                        }
                        if(timex==TRUE)
                                {
                                time();  timex=FALSE;/*keep time on screen*/
                                }

}
acp_clr();

if(escapex==TRUE) {return;} printf(CLRSCRN);
        ltemp=Mix_flowmeter;/* load temp reg*/
                ftemp=(float)Mix_flowmeter;
                ftemp=ftemp/1000; /* convert to 3 dp format*/
/*                      12345678901234567890123456789012345678901234567890*/
        printf("^\x11%c%c     Enter Mix Water flowmeter k         ",1,1);
        printf("^\x11%c%cOld k factor %5.3f   ",3,15,ftemp);
            get_ideclong(40000.0);
              Mix_flowmeter=ltemp;
                if(escapex==TRUE) return;

printf(CLRSCRN);
```

```
            ltemp=(float)Discharge_flowmeter;
            ftemp=ftemp/1000; /* convert to 3 dp format*/
/*              12345678901234567890123456789012345678901234567890*/
        printf("~\x11%c%c       Enter Discharge flowmeter k       ",1,1);
        printf("~\x11%c%cOld k factor %5.3f   ",3,15,ftemp);
           get_ideclong(40000.0);
            Discharge_flowmeter=ltemp;
                if(escapex==TRUE) return;

printf(CLRSCRN);
        ltemp=Dry_feeder;/* load temp reg*/
                ftemp=(float)Dry_feeder;
                ftemp=ftemp/1000; /* convert to 3 dp format*/
/*                  12345678901234567890123456789012345678901234567890*/
        printf("~\x11%c%c           Enter Dry Feeder k           ",1,1);
        printf("~\x11%c%cOld k factor %5.3f   ",3,15,ftemp);
           get_ideclong(40000.0);
            Dry_feeder=ltemp;
                if(escapex==TRUE) return;

printf(CLRSCRN);
        ltemp=Dry_run_response;/* load temp reg*/
                ftemp=(float)Dry_run_response;
                ftemp=ftemp/1000; /* convert to 3 dp format*/
/*                  12345678901234567890123456789012345678901234567890*/
        printf("~\x11%c%c    Dry Feeder Normal Running Response   ",1,1);
        printf("~\x11%c%c     1= No Dampening   0= Full Dampening ",2,1);
        printf("~\x11%c%cOld   factor %5.3f   ",3,15,ftemp);
           get_ideclong(1.0);
            Dry_run_response=ltemp;
                if(escapex==TRUE) return;

printf(CLRSCRN);
        ltemp=Dry_start_response;/* load temp reg*/
                ftemp=(float)Dry_start_response;
                ftemp=ftemp/1000; /* convert to 3 dp format*/
/*                  12345678901234567890123456789012345678901234567890*/
        printf("~\x11%c%c        Dry Feeder Start-up Response     ",1,1);
        printf("~\x11%c%c     1= No Dampening   0= Full Dampening ",2,1);
        printf("~\x11%c%cOld   factor %5.3f   ",3,15,ftemp);
           get_ideclong(1.0); /* upper inc limit = 1*/
            Dry_start_response=ltemp;
                if(escapex==TRUE) return;

printf(CLRSCRN);
        ltemp= kMAX_analog[DENSITY_CH];/* load temp reg*/
                ftemp=(float)ltemp;
                ftemp=ftemp/1000; /* convert to 3 dp format*/
/*                  12345678901234567890123456789012345678901234567890*/
        printf("~\x11%c%c       Densitometer Full Scale @20ma.    ",1,1);
        printf("~\x11%c%c                                         ",2,1);
        printf("~\x11%c%cOld    factor %3.3f   ",3,15,ftemp);
           get_ideclong(25.0); /* upper inc limit */
            kMAX_analog[DENSITY_CH]=ltemp;
                if(escapex==TRUE) return;

printf(CLRSCRN);
        ltemp=kMIN_analog[DENSITY_CH];/* load temp reg*/
                ftemp=(float)ltemp;
                ftemp=ftemp/1000; /* convert to 3 dp format*/
/*                  12345678901234567890123456789012345678901234567890*/
```

```
              printf(" \x15%c%c                                        ",2,1);
              printf("\x11%c%cOld    factor %5.3f  ",3,15,ftemp);
                  get_ideclong(12.0); /* upper inc limit */
                  kMIN_analog[DENSITY_CH]=ltemp;
                      if(escapex==TRUE) return;

printf(CLRSCRN);
          ltemp=ratio_response;/* load temp reg*/
                  ftemp=(float)ratio_response;
                  ftemp=ftemp/1000; /* convert to 3 dp format*/
/*                       1234567890123456789012345678901234567890*/
              printf("\x11%c%c        Mix Water/Discharge Injection   ",1,1);
              printf("\x11%c%c                 Response               ",2,1);
              printf("\x11%c%cOld    factor %5.3f  ",3,15,ftemp);
                  get_ideclong(1.0); /* upper inc limit */
                  ratio_response=ltemp;
                      if(escapex==TRUE) return;

}

/* hl is high limit*/
void get_ideclong(float hl)/* used by any long that needs to be entered, printa at 4,15*/
        {
/*        float hl;*/
          int acp_flg=FALSE; /* preset*/
                  while(acp_flg==FALSE)
                      {
          if(timex==TRUE){time(); timex=FALSE;}/*keep time on screen*/
                  key_typ=key_chk();
                      if(key_typ == 1) /* then normal exit*/
                          {
                          acp_flg=TRUE;
                          acp_clr();
                          }
                      if(key_typ == 2) /* then hard exit screen*/
                          {
                          esc_clr();
                          escapex=TRUE;
                          return;
                          }
                      if(key_typ == 4) /*inc k fac*/
                          {
                          direction=UP; /*increment*/
                  log_scale();/* scale the long and update ftemp*/
                  if( ftemp>hl)
                          {
                          ftemp=hl;
                          ltemp=(long)(ftemp*1000); /* clamp out */
                          }
                  printf("\x11%c%c%5.3f    ",4,15,ftemp);
                          cyc_ctr++;
                          qtr_key();
                          }
              /*check dec*/
                      if(key_typ == 3) /*dec k factor */
                          {
                          direction=DOWN;
                  log_scale();/* flt,int*/
```

```
                              cyc_ctr++;
                              qtr_key();
                              }
              if(key_typ==FALSE)
                    cyc_ctr=0;/* after key is released clear ctr*/
                    }
/* global ltemp still contains current new or old long */
      }
```

```c
#include <int6811.h>
/****************************************************************
  acs2.c

*****************************************************************/
#include <stdarg.h>
#include <stdio.h>
#include <io6811.h>
#include <ctype.h>
#include <ioacs.h>
#include <acsio.h>
#include <string.h>
#include <protos.acs> /*prototyping file*/
/****************************************************************/
extern  float   old_total;
extern  int     direction;
extern  int     timex;
extern  int     startup;
extern  float   Slurry_total;
extern  float   Dry_total;
extern  float   Old_span;
extern  float   Old_dry_span;
extern  int     water_step_rate;
extern  int     dry_step_rate;
extern  int     Stages;

extern          int     steps;
extern          long    Wsg[10];
extern          long    ppg[10];
extern          long    Csg[10];
extern          int     Stage_touched[10];
extern          int     steps;
extern          int     key_typ;
extern          float   hl;
extern          int     cyc_ctr;
extern          int     stage_ctr;

extern          int     ESC;
extern          long    ltemp;
extern          float   ftemp;

extern unsigned char temp[16];
extern          char    out_buf[MAXC_IN+1];
extern          STDIN,STDOUT;   /*point getc -putc to proper buffer*/
extern          int     scnt;
extern          int     btst;
extern          int     seconds;
extern          int     secflag;
extern          int     key_flg;/*.25 sec key switch check flag*/
extern          int     milclok; /*initialize clocks*/
extern          int     tsec;    /*below used in RTC routines */
extern          int     tmin;
extern          int     thr;
extern          int     tpam;    /*am/pm*/
extern          int     old_sec;
extern          int     start_flg;
/*extern        int     RAMREF;*/
extern          int     STAT;
/*extern        TEXT            stra0[64];*/
extern          TEXT    anlog_str[64];
extern          TEXT    count_str[64];
extern          TEXT    tmp_strng[64];
extern          long    tmp_long;       /*used for atol and others*/
extern          FILE    cfile[6];       /*make 6 comm files*/
```

```
#define     com1    cfile[0]        /*SCI in ,used for floppy storage*/
#define     com2    cfile[1]        /*SCI out, 9600 baud*/
#define     com3    cfile[2]        /* io485 in 9600 during test*/
#define     com4    cfile[3]        /* io485 out */
#define     com5    cfile[4]        /* LCD out,2400 baud*/
#define     com6    cfile[5]        /* LCD in (not used)*/

/*********************************************************************
*********************************************************************/

/* job data

Up to 10 stages. Each stage enter ppg,Wsq,Csq.
*/ job_data()
        {
int     STDOUT =comm5; /* lcd */
int     cursor_x=10;
int     cursor_y=2;
int     fcount=2;
int     acp_flg = FALSE;
/*      */
        printf(CLRSCRN);
/*              12345678901234567890123456789012345678890*/
printf("~\x11%c%c        Job Entry           ",1,1);
        printf("~\x11%c%cEnter/Edit Job Data",2,12);
        printf("~\x11%c%cClear Old Job Data",3,12);
        printf("~\x11%c%c>",((char)cursor_y),((char)cursor_x));
        while (acp_flg == FALSE)
        {
        if(timex==TRUE){time();  timex=FALSE;}/*keep time on screen*/
                key_typ = key_chk();
                        if(key_typ == 4){       /* increment */
                        {
        printf("~\x11%c%c ",((char)fcount),10);/*clear previous*/
                        fcount=fcount+1;
                        if( fcount >= 4)
                                fcount = 2;
                        }
        printf("~\x11%c%c>",((char)fcount),10); /*write new*/
                        fwd_clr();
                        } if(key_typ == 3){       /* decrement */
                        {
        printf("~\x11%c%c ",((char)fcount),10);/*clear previous*/
                        fcount--;
                        if( fcount < 2)
                                fcount = 3;
                        }
        printf("~\x11%c%c>",((char)fcount),10); /*write new*/
                        rev_clr();
                        }
                                        /* now check accept */
                        if(key_typ == 1){
                                acp_flg = TRUE;
                                acp_clr();
                                }
                        if(key_typ==2)
                                {
                                esc_clr();
                                return;
```

```
                    }
                    switch (fcount){
                            case 2:
                                    set_job_data();
                                    break;
                            case 3:
                                    clear_job_data();
                                    break;
                            default:
                                    return;
                                    break;
                    }
}
/****************************************************************/ clear_job_data()
{
        int stagex_ctr=0;
          while (stagex_ctr<10) /* 0-9 locations*/
                {
                Wsg[stagex_ctr]=(long)(1.00*1000);
                ppg[stagex_ctr]=160001;/* 16*/
                Csg[stagex_ctr]=(long)(3.15*1000);
                Stage_touched[stagex_ctr]=FALSE;/* programmed or not flag */
                stagex_ctr++;
                startup=TRUE; /* put back in start up mode */
                Slurry_total=0;
                Dry_total=0;
                Old_span=0;
                Old_dry_span=0; /* filter factor clear */
                water_step_rate=1;
                dry_step_rate=1;
                Stages=0;
                stage_ctr=0;
                old_total=0;
                }
        steps=0;
}
/****************************************************************/ set_job_data() /* edits and inserts job data */
{
int     STDOUT =comm5; /* lcd */
int     cursor_x=31;
int     cursor_y=3;
int     fcount=31;
int     acp_flg = FALSE;
int     exit=FALSE;
int     exit2=FALSE;
int     r1,r2;
int     r3;
int     selection_complete;

printf(CLRSCRN);
/* now set/edit data */ printf(CLRSCRN);
        ltemp=(long)stage_ctr;/* load temp reg*/
/*                 12345678901234567890123456789012345678900*/
        printf("~\x11%c%c            Use INC/DEC",1,1);
        printf("~\x11%c%c         Stage to Edit/Enter?      ",2,1);
```

```
while(exit==FALSE)
    {
    if(timex==TRUE){printf("~\x11%c%c ",3,1);/* dummy */timex=FALSE;}/*keep time on screen*/
        key_typ=key_chk();
                    if(key_typ==4) /*inc*/
                        {
                        stage_ctr++;
                            if(stage_ctr>9)
                                stage_ctr--;
printf("~\x11%c%c              > %ld ",3,1,stage_ctr+1);
                        hlf_key(); /* allow recycle */
                        } if(key_typ==3) /*dec*/
                        {
                        stage_ctr--;
                            if(stage_ctr<0)
                                stage_ctr=0;
printf("~\x11%c%c              > %ld ",3,1,stage_ctr+1);
                        hlf_key(); /* allow recycle */
                        }
                    if(key_typ == 2) /* then hard exit screen*/
                        {
                        esc_clr();
                        return;
                        } if(key_typ == 1) /* */
                        {
                        acp_clr();
                        exit2=TRUE;
                        }

}
exit=FALSE;
        while((exit==FALSE) && (stage_ctr<10))
        {
        printf(CLRSCRN);

/*                  12345678901234567890123456789012345678890*/ printf("~\x11%c%c Inc/Dec to change:       |Stage %ld ",1,1,stage_ctr+1);
        printf("~\x11%c%c                          |    ",2,1);
        printf("~\x11%c%c                          |    ",3,1);
        printf("~\x11%c%c                          |    ",4,1);

/* fall through each of 3 to enter */
        ltemp=ppg[stage_ctr];
        ftemp=(float)ltemp/1000;
            printf("~\x11%c%c> %2.2f  ",2,9,ftemp);/* cursor and old value*/
            printf("~\x11%c%cppg",2,5);
        job_idec(25.0);
            if(ESC==TRUE) /* exit screen*/
                {
                ESC=FALSE;
                return;
                }
                else
                    {       /* program all stage parms , ppg already entered */
        ppg[stage_ctr]=ltemp; /* store ppg and display in done corner */
```

```
                printf("\x11%c%c2.2f ppg",2,2,ftemp);/*print entered psi */
/* now do Csg */
        ltemp=Csg[stage_ctr];
        ftemp=(float)ltemp/1000;
                printf("\x11%c%c> %2.2f ",2,9,ftemp);/* cursor and old value*/
                printf("\x11%c%cCemt sg",2,1);
        job_idec(5.0);/* 5 Csg max */
        Csg[stage_ctr]=ltemp;
                printf("\x11%c%c>",2,9);/* cursor */
                printf("\x11%c%c%2.2f Csg",3,28,ftemp);/*print entered cement sg */
/* now do Water sg "Wsg*/
        ltemp=Wsg[stage_ctr];
        ftemp=(float)ltemp/1000;
                printf("\x11%c%c> %2.2f ",2,9,ftemp);/* cursor and old value*/
                printf("\x11%c%cWater sg",2,1);
        job_idec(2.0);/* 1.5 Csg max */
        Wsg[stage_ctr]=ltemp;
                printf("\x11%c%c>",2,9);/* cursor */
                printf("\x11%c%c%2.2f Wsg",4,28,ftemp);/*print entered cement sg */

}
                printf("\x11%c%c Accept Parimeters? ",4,1);/* accept ? */
                key_typ=9;
                ESC=FALSE;
        while (ESC==FALSE)
                {
if(timex==TRUE){printf("\x11%c%c ",3,1);/* dummy */timex=FALSE;}/*keep time on screen*/
                key_typ=key_chk();
                if(key_typ==1)/* accp */
                        {
                        acp_clr();
                        ESC=TRUE;
                        stage_ctr++;
                                if(stage_ctr>9) exit=TRUE;
                        }
                if(key_typ==2)/* esc*/
                        {exit=FALSE;
                        esc_clr();
                        ESC=TRUE;
                        }
                }
                printf("\x11%c%cPassed",3,1);/* test */

}
}
/******************************************************************/
/* job idec */
job_idec(  hlx ) /* hlx for upper clamping */
{
        int acp_flg; /* preset*/
        cyc_ctr=0; /* ftemp,ltemp,cyc_ctr, and ESC are globals */
/*      int key_typ;*/ while(acp_flg==FALSE)
                        {
/*                      time();*/
if(timex==TRUE){printf("\x11%c%c ",3,1);/* dummy */timex=FALSE;}/*keep time on screen*/
                key_typ=key_chk();
                        if(key_typ == 1) /* then normal exit*/
                                {
                                ESC=FALSE;
                                acp_flg=TRUE;
                                acp_clr();
                                }
                        if(key_typ == 2) /* then hard exit screen*/
```

```
                        ESC=TRUE;              /* global flag*/
                        esc_clr();
                        return;
                        }
                if(key_typ == 4) /*inc */
                        {
                        direction=UP; /*increment*/
                log_scale();/* scale the long and update ftemp*/
                if( ftemp>hlx)
                        {
                        ftemp=hlx;
                        ltemp=(long)(ftemp*1000); /* clamp out */
                        }
                printf("~\x11%c%c%5.2f   ",2,11,ftemp);
                        cyc_ctr++;
                        qtr_key();
                        }
        /*check dec*/
                if(key_typ == 3) /*dec k factor */
                        {
                        direction=DOWN;
                log_scale();/* flt,int*/
                printf("~\x11%c%c%5.2f   ",2,11,ftemp);
                        cyc_ctr++;
                        qtr_key();
                        }
        if(key_typ==FALSE)
                cyc_ctr=0;/* after key is released clear ctr*/
                }
/* global ltemp still contains current new or old long */
        }
/************************************************************************/
```

```c
/*#include <into811.h>
*************************************************************************
    acs3.c

*************************************************************************/
#include <stdarg.h>
#include <stdio.h>
#include <io6811.h>
#include <ctype.h>
#include <ioacs.h>
#include <acsio.h>
#include <string.h>
#include <protos.acs> /*prototyping file*/
/************************************************************************/
extern int Auto;
extern int     d_update;
int gate=0;
float   lprint=0;
float   gprint=0;
float   dprint=0;

extern  int dry_dac;
extern  int water_dac;
int u_bit=FALSE;
int d_bit=FALSE;
int xDN = FALSE;
int xUP = FALSE;
int dDN =FALSE;
int dUP =FALSE;
water_mode_up=FALSE;
water_mode_dn=TRUE;
dry_mode_up=FALSE;
dry_mode_dn=TRUE;
extern  float tub_factor;
int     tub_direction=UP;
int     water_dac_sync=0;
int     dry_dac_sync=0;
int     dry_dac_rate=0;
int     water_dac_rate=0;
int     tprint=0;
float   diff=0;
float   Running_Wsg;
float   Running_ppg;
float   Running_Csg;
float   Target_sg;
float   old_total=0;
float   stage_total=0;

extern  int     startup;
/*int    steady=FALSE;                    declare unsteady */
int     Slurry=OFF;
int     water_step_rate=1;
int     dry_step_rate=1;
long    density_temp=0;
long    level_temp=0;
long    gate_temp=0;
int     level=0;
int     density=0;
int     density_ctr=0;
int     level_ctr=0;
int     gate_ctr=0;
int     steady_ctr=0;
int     Steady=FALSE;
```

```
float    t_temp;

float    Dry_rpm=0;
float    Dry_total=0;
float    Dry_pounds_min=0;
float    Cu_ft_min_dry=0;
float    Water_rate=0;
float    Water_total=0;
float    Slurry_rate=0;
float    Slurry_total=0;
float    Water_percent=0;
float    Cement_percent=0;
float    Water_demand=0;
float    Correction_span=0;
float    Old_span=0;
float    Old_dry_span=0;
float    Dry_gallons_minute=0;
float    Dry_demand=0;
float    Ho=0;
float    Co=0;
float    gate_mul=0;
float    gate_min=0;
float    gate_span=0; /* % */
float    level_span=0;
float    level_mul=0;
float    level_min=0;
float    inches=0;
float    reference=0;
float    real_ppg=0;
float    density_span;
float    density_mul;
float    last_flow=99;
extern   unsigned char CHAN;
extern   unsigned int KDATA;
extern   long Discharge_flowmeter;
extern   long Dry_feeder;
extern   long Mix_flowmeter;
extern   long ratio_response;
extern   long Dry_start_response;
extern   long Dry_run_response;
extern   int    direction;
extern   long density_max;
extern   long density_min;
extern   long k_offset[MAXCHANNELS];
extern   long kMAX_analog[MAXCHANNELS];
extern   long kMIN_analog[MAXCHANNELS];
extern   int level_update;
extern   int flow_check;
/* output capture stuff */
unsigned int temp_oc4=0;
unsigned int temp_oc3=0;
int      dry_mode=OFF;
int      oc4_on_time=0;
int      oc4_off_time=0;
int      oc3_on_time=0;
int      oc3_off_time=0;
int      water_mode=OFF;
int      water_direction=DOWN;
int      t_direction=DOWN;
int      dry_direction=DOWN;
int      d_direction=DOWN;

extern           unsigned int ic1raw; /* actual raw passed to whoever wants it */
extern           unsigned int ic2raw;
extern           unsigned int ic3raw;
```

```
extern      unsigned long   ic1tot; /* absolute pulse totals */
extern      unsigned long   ic2tot;
extern      unsigned long   ic3tot;
extern      unsigned long   ic4tot;

extern      unsigned long   ic1temp;/* averaging temp */
extern      unsigned long   ic2temp;
extern      unsigned long   ic3temp;
extern      unsigned long   ic4temp;

extern      unsigned int    ic1_old;/* to do new-old=period */
extern      unsigned int    ic2_old;
extern      unsigned int    ic3_old;
extern      unsigned int    ic4_old;

extern      int     ic1_ctr;/* to keep track of divide by 4 front */
extern      int     ic2_ctr;/* end raw average */
extern      int     ic3_ctr;
extern      int     ic4_ctr;

extern      int     time_out1;
extern      int     time_out2;
extern      int     time_out3;
extern      int     time_out4;

extern      int     run;
extern      int     steps;
extern      long    Wsq[10];
extern      long    ppq[10];
extern      long    Csq[10];
extern      int     Stage_touched[10];
extern      int     steps;
extern      int     key_typ;
extern      float   h1;
/*extern    int     cyc_ctr;*/
extern      int     stage_ctr;

extern      int     ESC;
extern      long    ltemp;
extern      float   ftemp;

extern unsigned char temp[16];
extern      char    out_buf[MAXC_IN+1];
extern      STDIN,STDOUT;   /*point getc -putc to proper buffer*/
extern      int     scnt;
extern      int     btst;
extern      int     seconds;
extern      int     secflag;
extern      int     key_flg;/*.25 sec key switch check flag*/
extern      int     milclok;   /*initialize clocks*/
extern      int     tsec;    /*below used in RTC routines */
extern      int     tmin;
extern      int     thr;
extern      int     tpam;   /*am/pm*/
extern      int     old_sec;
extern      int     start_flg;
/*extern    int     RAMREF;*/
extern      int     STAT;
/*extern    TEXT            stra0[64];*/
extern      TEXT            anlog_str[64];
extern      TEXT            count_str[64];
extern      TEXT            imp_strng[64];
```

```c
extern      FILE        cfile[6];           /*make 6 comm files*/
/*extern               char        CR_TEXT;*/
#define     com1        cfile[0]            /*SCI in ,used for floppy storage*/
#define     com2        cfile[1]            /*SCI out, 9600 baud*/
#define     com3        cfile[2]            /* io485 in 9600 during test*/
#define     com4        cfile[3]            /* io485 out */
#define     com5        cfile[4]            /* LCD out,2400 baud*/
#define     com6        cfile[5]            /* LCD in (not used)*/
/***************************************************************/
/* A coefficient of zero means the pwm signal will "hold" */
int Coefficient[32]={0,0,0,1,1,1,1,1,1,1,1,1,1,1,1,1,   /* ratiometer */
        1,1,1,1,2,2,2,2,2,2,2,2,2,2,2,2}; /* mix water pump */
int S_Coefficient[32]={3,3,4,5,5,5,5,5,6,6,6,6,6,7,7,  /* water start up */
        8,9,9,10,10,11,11,12,14,16,17,18,19,20,20,20};
/***************************************************************/
int Dry_start_Coefficient[32]={1,1,2,2,2,3,4,4,5,5,5,6,6,6,7,7,
        8,9,9,10,10,11,11,12,14,16,17,18,19,20,20,20};   /*dry feeder */
/***************************************************************/
int Dry_run_Coefficient[32]={1,1,1,1,1,1,1,1,1,1,2,2,2,2,2,2,
        2,2,2,2,2,2,2,2,2,2,2,2,2,2,2,2}; /* simulator table*/
/***************************************************************/
run_acs()
{
int     STDOUT =comm5; /* lcd */
int     exit=FALSE;
int     old_stage=0;
int     steady_ctr=0;
            startup=TRUE;   /* reset start timer */
stage_ctr=0;
level_span=30.0-4.0;/*=26"  4 to 30 inches does not change now */
level_mul=level_span/(ADBIT-1157);/*4ma offset */
level_min=4.0;/*" get scale offset adder */
gate_span=100; /* % */
gate_mul=gate_span/(ADBIT-1157);
gate_min=0;
d_update=0;
density_span=(float)kMAX_analog[density_ch]-(float)kMIN_analog[density_ch]; /* 8 to 22 ppg */
density_mul=density_span/(ADBIT-(float)k_offset[density_ch]);
density_min=8.0;
time_out1=0;
time_out2=0;
time_out3=0;
time_out4=0;
        remotedisplay();

STDOUT=comm5;
printf(CLRSCRN);
    /*      12345678901234567890123456789012345678890*/
printf("~\x11%c%cMix Water        bbl/min |----->Stage      ",1,1);
qtr_key();
printf("~\x11%c%cDischarge        bbl/min |Total            ",2,1);
qtr_key();
printf("~\x11%c%cTarget ppg                |Stage            ",3,1);
qtr_key();
printf("~\x11%c%cActual ppg       \"STEADY\"|                 ",4,1);
qtr_key();
/* do calc first time */
        Running_Wsg=(float)Wsg[stage_ctr]/1000; /* run time vars */
        Running_ppg=(float)ppg[stage_ctr]/1000; /* convert from long */
        Running_Csg=(float)Csg[stage_ctr]/1000; /* to float .xxx */
        Target_sg= Running_ppg / (Running_Wsg*8.3452984);

Steady=FALSE;                   /* declare unsteady */
        oc4_on_time=0;/* reset output steps */
        oc3_on_time=0;
```

```
water_dac=0;
seconds=0;
startup=TRUE;

while((stage_ctr<10) && (exit == FALSE))
{
if(exit==TRUE) return;

while(key_chk() != 2)
        {
run_time();    /* main run function */
        if(TRUE==stage_chk())          /* see if next stage*/
                { /* re calc new stage parms */
Running_Wsg=(float)Wsg[stage_ctr]/1000; /* run time vars */
Running_ppg=(float)ppg[stage_ctr]/1000; /* convert from long */
Running_Csg=(float)Csg[stage_ctr]/1000; /* to float .xxx */
Target_sg= Running_ppg / (Running_Wsg*8.3452984);
Steady=FALSE;                  /* declare unsteady */
stage_total=0;
d_update=0;
                }
        if(TRUE==ppg_trim())
                {
Running_Wsg=(float)Wsg[stage_ctr]/1000; /* run time vars */
Running_Csg=(float)Csg[stage_ctr]/1000; /* to float .xxx */
Target_sg= Running_ppg / (Running_Wsg*8.3452984);
Steady=FALSE;                  /* declare unsteady */
d_update=0;
                }
        }
        run=FALSE; /* turn off devices */
                exit=TRUE;
                PORTGS= WATER_DN_OFF;   /*turn off valves */
                PORTGS= WATER_UP_OFF;
                PORTGS= DRY_UP_OFF;     /*turn off pwm valve */
                PORTGS= DRY_DN_OFF;
        clear_dacs();
        }
}
/**************************************************************/
run_time()      /* main sub run-time loop */
{
int     xtemp,xtemp2,xtemp3;
long    t_long;

float k_span,mul,min,gtemp; /* for zero and span*/

/* generate rates/totals, do floating point calcs etc. to pass to ints */
/* interrupts are running free during all of this time consuming stuff */

/* _____ */
/* first scale level control , result is real inches */
        level_temp=level_temp+((long)do_a_d(LEVEL_CH));/* */
                level_ctr++;
                if(level_ctr>4)
                        {
                        level_ctr=0;
                        level=level_temp/5;
                        level_temp=0;
                        }
        xtemp=level - 1157;
                if(xtemp<0)
                        xtemp=0;
inches=((float)xtemp * level_mul) + level_min;/* scale and add display offset*/
```

```
/* ------------------------------------------------------------ */
/* scale density to 8ppg to 22ppg , result is real ppg*/ k_span=(float)KMAX_analog[DENSITY_CH]-(float)KMIN_analog[DENSITY_CH];
            mul=k_span/((ADBIT-(float)k_offset[DENSITY_CH]));/*auto scale*/
            min=(float)KMIN_analog[DENSITY_CH]/1000;/*get scale offset adder */
            xtemp=(do_a_d(DENSITY_CH)) - k_offset[DENSITY_CH];
                /**/
                if(xtemp<0)
                        xtemp=0; /* */
        real_ppg=(((float)xtemp*mul)/1000) + min;/* scale and add display offset*/
        dprint= real_ppg;
/*
        xtemp=density - k_offset[density_ch];
                if(xtemp<0)
                        xtemp=0;
        real_ppg=((float)xtemp * density_mul) + density_min;
*/

/* now correct density if necessary once every 10 seconds, if that feature is enabled   */
        if( (d_update >10) && (Steady==TRUE) && (Auto==ON))
                {/* check for disagreement between density meter and target */
                d_update=0;
                        if(Running_ppg < real_ppg )/* actual too high */
                                { /* then reduce sg used in run time calculations */
                                Target_sg=Target_sg*(Running_ppg/real_ppg);/* mul ratio*/
                                Steady==FALSE;                 /* mul ratio <1 */
                                }
                        if(Running_ppg > real_ppg) /* real too low */
                                {
                                Target_sg=Target_sg*(Running_ppg/real_ppg);/* mul ratio*/
                                Steady==FALSE;                 /* mul ratio >1 */
                                }
                }
/* ------------------------------------------------------------ */

/* now get mix water flow rate & total in  gal*/
        if(ic3raw != 0)
                {
                l_temp=CRYSTAL/(unsigned)ic3raw; /* get suction frequency */
                Water_rate=((float)l_temp)/((float)Mix_flowmeter);
                    l_temp=Mix_flowmeter * 60;/* assume per min   */
                        f_temp=((float)ic3tot)*1000; /* 3dp adjust*/
                    Water_total=f_temp/(float)l_temp;
                }
        else    Water_rate=0.0;
/* now get discharge rate & total in gallons ,also check for fast slope */
        if(ic2raw != 0)
                {
                l_temp=CRYSTAL/(unsigned)ic2raw; /* get discharge frequency */
                Slurry_rate=((float)l_temp)/((float)Discharge_flowmeter);
                    l_temp=Discharge_flowmeter * 60;/* use same k factor as rate */
                        f_temp=((float)ic2tot)*1000; /* 3dp adjust*/
                    Slurry_total=f_temp/(float)l_temp;
                stage_total=Slurry_total-old_total;
                }
        else Slurry_rate=0;
                        if(flow_check==TRUE) /* from timer */
                                {
                                flow_check=FALSE; /* reset flag */
                                /* if more than .5 bbl in 1 second ,trig startup*/
                                if( (Slurry_rate > last_flow+FLOW_BAND) ||
                                    (Slurry_rate < last_flow-FLOW_BAND) )
                                        {
                                        startup=TRUE;/* revert to startup*/
```

```
                                        seconds=0;
                                        d_update=0;
                                        steady_ctr=0;
                                        }
                        last_flow=Slurry_rate; /* update for next time*/
                    }
            if(Slurry_rate < MIN_OPERATION)
                                        {
                                        steady_ctr=0;
                                        Steady=FALSE;
                                        run=FALSE;
                                        startup=TRUE;
                                        }
                        else run=TRUE;

/* Note: the interrupt "tasks" do raw filtering.
 The foreground only sets up target requests/changes */
/*      if(Slurry==ON)  if discharge is running {*/
            /* use the primary demand equation, absolute cement by volume */
Cement_percent=(Target_sg-Running_Wsg)/(Running_Csg-Running_Wsg);
        Water_percent=1-Cement_percent; /* in 0-1format*/
                Water_demand=Slurry_rate * Water_percent;
/* no dead band */
                if(run==FALSE) Water_demand=0; /* fast turn off */
                if(Water_rate<Water_demand)
                {
        Correction_span=( Water_demand/PUMP_BIT)-(Water_rate/PUMP_BIT);
                        if(t_direction==DOWN) Old_span=0; /* reset filter factor */
                        t_direction=UP;
                }
                else    {
        Correction_span=( Water_rate/PUMP_BIT)-(Water_demand/PUMP_BIT);
                        if(t_direction==UP) Old_span=0; /* reset filter factor */
                        t_direction=DOWN;
                        }
if((startup !=TRUE) && (run != FALSE))
        {
        diff=Correction_span-Old_span;
        Correction_span=(((diff-Old_span) * ((float)ratio_response/1000)) +Old_span;
        Old_span=Correction_span; /* for next time */
        }
/* shut down interrups during this write */
        else xtemp2=((int)Correction_span)/25; /*X50  32 pole filter table */ if(xtemp2<0) xtemp2=0;
                if(xtemp2>31) xtemp2=31;
        if((startup==TRUE) || (run==FALSE))
                xtemp=S_Coefficient[xtemp2];
                else xtemp=Coefficient[xtemp2];

disable_interrupt();
        water_step_rate=xtemp;
        water_direction=t_direction;
        enable_interrupt();
/* these values are(have been) passed to the using ints */

/* dry feeder calculations */
/* now get dry rate(gate opening) , result in % */
        gate_temp=gate_temp+((long)do_a_d(GATE_CH));/*  */
                gate_ctr++;
                if(gate_ctr>4)
                        {
```

```
                                gate=gate_temp/5;
                                gate_temp=0;
                                }
        xtemp=gate - 1157;/* sub 4 ma */
                if(xtemp<0)
                        xtemp=0;

qtemp=((float)xtemp * gate_mul)/100;/*0-1*/
        qprint=qtemp*100;
        Cu_ft_min_dry=qtemp*(((float)Dry_feeder)/1000); /* dry opening %  fs dry */

/*              Dry_pounds_min=Cu_ft_min_dry * BULK_WEIGHT;   94 #/min */

/* ###########################IN START UP MODE ? ###########################*/

/* now do dry feeder output using bulk density. ! Just for startup */
/* If not in startup then run normal based on level ctl */ if((startup==TRUE) || (run==FALSE))
         { /* then calculate ammount of bulk cement required */
           Ho = 7.4805 * (8.3452984 * Running_Wsg); /* weight per cuft of mix water */
           Co= BULK_WEIGHT /(Running_Csg * Ho); /* percent of bulk volume real */
           Dry_gallons_minute=(Cu_ft_min_dry * Co)* 7.4865; /* absolute volume */
           Dry_demand=Slurry_rate * Cement_percent;
                if(Dry_gallons_minute<Dry_demand)
                        {
        Correction_span=( Dry_demand/FEEDER_BIT)-(Dry_gallons_minute/FEEDER_BIT);
                        if(d_direction==DOWN) Old_dry_span=0; /* reset filter factor */
                        d_direction=UP;
                        }
                else    {
        Correction_span=( Dry_gallons_minute/FEEDER_BIT)-(Dry_demand/FEEDER_BIT);
                        if(d_direction==UP) Old_dry_span=0; /* reset filter factor */
                        d_direction=DOWN;
                        } diff=Correction_span-Old_dry_span;
        Correction_span=(((diff-Old_dry_span) * ((float)Dry_start_response/1000))) +Old_dry_span;
        Old_dry_span=Correction_span;

/* shut down interrups during this write */ xtemp2=((int)Correction_span)/25; /*50;  32 pole filter table */
                        if(xtemp2<0) xtemp2=0;
                        if(xtemp2>31) xtemp2=31;
                xtemp=Dry_start_Coefficient[xtemp2];
                disable_interrupt();
                dry_step_rate=xtemp;
                dry_direction=d_direction;
                enable_interrupt();

/* mark level now!!!!!!!!!!!!!!! */
                reference=inches-1; /* note -1 if sonic dir is ever changed !!!!!!!!!*/
                d_update=0;

}       /* end of "if in start mode dry feeder " */

/* ################then we are not in the start up mode ###############*/
        else
           {
 * first get tub factor and mul by dry demand */
/* d_direction was set at beginning of function */
```

```
                Correction_span=inches-reference;
                        tub_direction=UP;
                        }
                else
                        {
                Correction_span=reference-inches;
                        tub_direction=DOWN;
                        }
                tub_factor=Correction_span/10; /*100; ** is 0 - 1.00%*/
        /* now calculate ammount of bulk cement required */
                Ro = 7.4805 * (8.3452984 * Running_Wsg); /* weight per cuft of mix water */
                Co= BULK_WEIGHT /(Running_Csg * Ro); /* percent of bulk volume real */
                Dry_gallons_minute=(Cu_ft_min_dry * Co)* 7.4805; /* absolute volume */
                Dry_demand=Slurry_rate * Cement_percent;
/* do tub factor*/
                if(tub_direction==UP) /* tub is too (lo?) */
                                {
                                Dry_demand=Dry_demand+(Dry_demand*tub_factor);
                                }
                else
                                {
                                Dry_demand=Dry_demand-(Dry_demand*tub_factor);
                                }
/* now do conventional ctl loop */
                if(Dry_gallons_minute<Dry_demand)
                        {
                Correction_span=( Dry_demand/FEEDER_BIT)-(Dry_gallons_minute/FEEDER_BIT);
                        if(d_direction==DOWN) Old_dry_span=0; /* reset filter factor */
                        d_direction=UP;
                        }
                else    {
                Correction_span=( Dry_gallons_minute/FEEDER_BIT)-(Dry_demand/FEEDER_BIT);
                        if(d_direction==UP) Old_dry_span=0; /* reset filter factor */
                        d_direction=DOWN;
                        } diff=Correction_span-Old_dry_span;
        Correction_span=(((diff-Old_dry_span) * ((float)Dry_run_response/1000))) +Old_dry_span;
        Old_dry_span=Correction_span; /* for next time */

/* shut down interrups during this write */ xtemp2=((int)Correction_span)/25; /*50;   32 pole filter table */
                        if(xtemp2<0) xtemp2=0;
                        if(xtemp2>31) xtemp2=31;
                xtemp=Dry_run_Coefficient[xtemp2];

disable_interrupt();
                dry_step_rate=xtemp;
                dry_direction=d_direction;
                enable_interrupt();
                }
/* is tank level steady ? _____*/
/* now get trend and test for stable level if time window,
        uses weighted voting method   */
 if(level_update==TRUE)
        {
        tprint=steady_ctr;
        level_update=FALSE; /* reset */
                if( (inches > (reference + STEADY_LEVEL))
                        || (inches < (reference - STEADY_LEVEL)) )
                                {
                                steady_ctr=steady_ctr-1; /* decrease twice as fast as increase */
```

```
                    {
                    steady_ctr=0;
                    Steady=FALSE;
                    }
            }
            else
            {
                    if(Steady != TRUE)
                    {
                            steady_ctr++;
                            if(steady_ctr > VOTE)
                            {
                            Steady= TRUE;/* global */
                            steady_ctr--;/* clamp */
                            }
                    }
            }
        } /* end of if level update */
/*end of if slurry == on */
/* now check for dead input captures */
        if(time_out1>TIMEOUT) {ic1raw=0; time_out1=0;}
        if(time_out2>TIMEOUT) {ic2raw=0; time_out2=0; Slurry=OFF;}/* discharge*/
        if(time_out3>TIMEOUT) {ic3raw=0; time_out3=0;}          /* mix water */
        if(time_out4>TIMEOUT) {ic4raw=0; time_out4=0;} display_acs();

}
/****************************************************************************/

/****************************************************************************/
void    vectoc3(void)                   /* task_0 oc3  dry feeder */
#define timsk3  0x20                    /*timer interrupt flag reset value */
        {

TFLG1 = timsk3;                         /*resets enable*/
        temp_oc3=TCNT;                          /* capture present time */
/* first branch to actual running valve if any */ if(dry_direction==UP) /* run up valve_____*/
        {
        dUP=TRUE; /* status flag */
        if(dDN==TRUE)
                {
                dDN=FALSE;
                oc3_on_time=PWM_MIN; /*reset states*/
                oc3_off_time=CINTIME3-oc3_on_time; /* set up off time */
                PORTGS= DRY_DN_OFF;     /*turn off other valve */
                dry_mode_up=OFF;
                }
        /*check pwm mode*/
        if(dry_mode_up==ON) /* was in on mode, now turn off and setup off mode */
                {
                dry_mode_up=OFF;                /* then set up off time */
                oc3_off_time=CINTIME3-oc3_on_time;
                TOC3=temp_oc3 + (unsigned)oc3_off_time;
                PORTGS= DRY_UP_OFF;     /*turn off this valve */
                }
                else/* do other half of pwm*/
                {
                if(run!=FALSE) PORTGC= DRY_UP_ON; /* turn on valve if running */
                dry_mode_up=ON; /* for next cycle */
                if(dry_step_rate != 0)oc3_on_time=oc3_on_time + dry_step_rate;
                        if(oc3_on_time >= PWM_MAX)
```

```
                        TOC3 = (unsigned)oc3_on_time + temp_oc3;
                    }
            return;
            } if(dry_direction==DOWN) /* do water down */
    {
        dDN=TRUE; /* flag */
        if(dUP==TRUE)/* zero crossing */
            {
            dUP=FALSE;
            oc3_on_time=PWM_MIN; /*reset states*/
            oc3_off_time=CINTIME3-oc3_on_time; /* set up off time */
            PORTGS= DRY_UP_OFF;    /*turn off OTHER pwm valve */
            dry_mode_dn=OFF;
            }
        if(dry_mode_dn==ON) /* was in on mode, now turn off and setup off mode */
            {
            dry_mode_dn=OFF;                /* then set up off time */
            oc3_off_time=CINTIME3-oc3_on_time;
            TOC3=temp_oc3 + (unsigned)oc3_off_time;
            PORTGS= DRY_DN_OFF;    /*turn off this valve */
            }
        else
            {
            dry_mode_dn=ON;
            /*if(run!=FALSE)   shut down !!!*/
             PORTGC= DRY_DN_ON; /* turn on valve if running */
            if(dry_step_rate != 0)oc3_on_time=oc3_on_time + dry_step_rate;
                        if(oc3_on_time >= PWM_MAX)
                            oc3_on_time=PWM_MAX;/* maxed out */
            TOC3  = (unsigned)oc3_on_time + temp_oc3;
            }
        return;
        }
}

/***************************************************************/

/* bang bang valve */ void    vectoc4(void)              /* task_1 oc4  water injection */
define timsk4  0x10               /*timer interrupt flag reset value */
{
        temp_oc4=TCNT;                      /* capture present time */
        TFLG1 = timsk4;                     /*resets enable*/
/* first branch to actual running valve if any */ if(water_direction==UP) /* run up valve_____*/
    {
        xUP=TRUE; /* status flag */
        if(xDN==TRUE)
            {
            xDN=FALSE;
            oc4_on_time=PWM_MIN; /*reset states*/
            oc4_off_time=CINTIME4-oc4_on_time; /* set up off time */
            PORTGS= WATER_DN_OFF;    /*turn off other valve */
            water_mode_up=OFF;
            }
        /*check pwm mode*/
        if(water_mode_up==ON) /* was in on mode, now turn off and setup off mode */
            {
            water_mode_up=OFF;              /* then set up off time */
```

```c
                TOC4=temp_oc4 + (unsigned)oc4_off_time;
                PORTGS= WATER_UP_OFF;    /*turn off this valve */
                }
                        else/* do other half of pwm*/
                        {
                if(run!=FALSE) PORTGC= WATER_UP_ON; /* turn on valve if running */
                water_mode_up=ON;        /* for next cycle */
                if(water_step_rate != 0)oc4_on_time=oc4_on_time + water_step_rate;
                                if(oc4_on_time >= PWM_MAX)
                                        oc4_on_time=PWM_MAX;/* maxed out */
                TOC4 = (unsigned)oc4_on_time + temp_oc4;
                        }
        return;
        } if(water_direction==DOWN) /* do water down */
        {
        xDN=TRUE; /* flag */
        if(xUP==TRUE)/* zero crossing */
                {
                xUP=FALSE;
                oc4_on_time=PWM_MIN; /*reset states*/
                oc4_off_time=CINTIME4-oc4_on_time; /* set up off time */
                PORTGS= WATER_UP_OFF;   /*turn off OTHER pwm valve */
                water_mode_dn=OFF;
                }
        if(water_mode_dn==ON) /* was in on mode, now turn off and setup off mode */
                {
                water_mode_dn=OFF;              /* then set up off time */
                oc4_off_time=CINTIME4-oc4_on_time;
                TOC4=temp_oc4 + (unsigned)oc4_off_time;
                PORTGS= WATER_DN_OFF;   /*turn off this valve */
                }
                else
                        {
                water_mode_dn=ON;
                /*if(run!=FALSE) !!!!!!shutdown */
                 PORTGC= WATER_DN_ON; /* turn on valve if running */
                if(water_step_rate != 0)oc4_on_time=oc4_on_time + water_step_rate;
                                if(oc4_on_time >= PWM_MAX)
                                        oc4_on_time=PWM_MAX;/* maxed out */
                TOC4 = (unsigned)oc4_on_time + temp_oc4;
                        }
        return;
        }
}

/***********************************************************************/
/* Dry feeder Input capture 1 */ void    vectIC1(void)                   /*  */
define timsk5 0x04                     /*timer interrupt flag reset value */

{
unsigned int ic;
        TFLG1 = timsk5;                         /*resets enable*/
        time_out1=0;
        ic=TIC1;
        ic1temp=ic1temp+((unsigned long)(ic-ic1_old)); /* raw period for foreground or other */
        ic1_old=ic;     /* store for next time */
                ic1_ctr++;
                        if(ic1_ctr==32)
```

```
                    ic1_ctr=0;
                    ic1raw=ic1temp/32; /* average 4 teeth */
                    time_out1=0;
                    ic1temp=0;
                    }
        ic1tot++; /* totals long*/
}

/*****************************************************************/ void    vectIC2(void)               /* discharge flowmeter */
define timsk6  0x02                /*timer interrupt flag reset value */

{
unsigned int ic;
        TFLG1 = timsk6;                     /*resets enable*/
        time_out2=0;        /* reset time out */
        ic=TIC2;
        ic2temp=ic2temp+((unsigned long)(ic-ic2_old)); /* raw period for foreground or other */
        ic2_old=ic;     /* store for next time */
            ic2_ctr++;
                    if(ic2_ctr==4)
                    {
                    ic2_ctr=0;
                    ic2raw=ic2temp/4; /* average n teeth */
                    time_out2=0;
                    ic2temp=0;
                    Slurry=ON;
                    }
        ic2tot++; /* totals long*/
/*      PORTGS=0x10;     bit 4 test
        PORTGC=0x10;*/
}

/*****************************************************************/ void    vectIC3(void)               /*  mix water */
define timsk7  0x01                /*timer interrupt flag reset value */

{
unsigned int ic;
        TFLG1 = timsk7;                     /*resets enable*/
        time_out3=0;
        ic=TIC3;
        ic3temp=ic3temp+((unsigned long)(ic-ic3_old)); /* raw period for foreground or other */
        ic3_old=ic;     /*store for next time */
            ic3_ctr++;
                    if(ic3_ctr==12)
                    {
                    ic3_ctr=0;
                    ic3raw=ic3temp/12;
                    time_out3=0;
                    ic3temp=0;
                    }
        ic3tot++; /* totals long*/
}

/*****************************************************************/ void    vectIC4(void)               /*  not currently used */
define timsk8  0x08                /*timer interrupt flag reset value */
```

```
unsigned int i;
    TFLG1 = timer8;               /*resets enable*/
}

/*******************************************************************/
```

```
/*include <int6811.h>
*************************************************************
  acs4.c
  lcd screen and das out
  ppg trim , a/d ,
*************************************************************/
#include <stdarg.h>
#include <stdio.h>
#include <io6811.h>
#include <ctype.h>
#include <ioacs.h>
#include <acsio.h>
#include <string.h>
#include <protos.acs>  /*prototyping file*/
/*************************************************************/
unsigned char   dac_ctr=0;
extern int Auto;
int     stager=0;
int     trimmer=0;
extern int dry_direction;
extern int d_direction;
extern float iprint;
extern float dprint;
extern float pprint;
extern int tprint;
extern  float Ho;
extern  float Co;
extern float old_total;
extern Correction_span;
extern float stage_total;
extern dry_dac;
extern water_dac;
extern water_dac_rate;
extern dry_dac_rate;
extern  float   Running_Wsg;
extern  float   Running_ppg;
extern  float   Running_Csg;
extern  float   Target_sg;

extern  unsigned char CHANX;
extern  unsigned char KDATA;
extern  unsigned char DACDATA;

extern  int     timex;
extern  int     Stages;
extern  int     startup;
/*extern          int     Steady;          declare unsteady */
extern  int     stage_ctr;
extern  int     Slurry;
extern  int     water_step_rate;
extern  int     dry_step_rate;
extern  long    density_temp;
extern  long    level_temp;
extern  int     level;
extern  int     density;
extern  int     density_ctr;
extern  int     level_ctr;
extern  int     steady_ctr;
extern  int     Steady;

extern  long    l_temp;
extern  float   f_temp;

extern  float   Dry_rpm;
```

```
extern  float     Dry_pounds_min;
extern  float     Cu_ft_min_ox;
extern  float     Water_rate;
extern  float     Water_total;
extern  float     Slurry_rate;
extern  float     Slurry_total;
extern  float     Water_percent;
extern  float     Cement_percent;
extern  float     Water_demand;
extern  float     Old_span;
extern  float     Old_dry_span;
extern  float     Dry_gallons_minute;
extern  float     Dry_demand;
extern  float     Ho;
extern  float     Co;
extern  float     level_span;
extern  float     level_mul;
extern  float     level_min;
extern  float     inches;
extern  float     reference;
extern  float     real_ppg;
extern  float     density_span;
extern  float     density_mul;
extern  float     last_flow;
extern  Discharge_flowmeter;
extern  long Dry_feeder;
extern  long Mix_flowmeter;
extern  long ratio_response;
extern  long Dry_start_response;
extern  long Dry_run_response;
extern  int       direction;
extern  long density_max;
extern  long density_min;
extern  long k_offset[MAXCHANNELS];
extern  long KMAX_analog[MAXCHANNELS];
extern  long KMIN_analog[MAXCHANNELS];
extern  int level_update;
extern  int flow_check;

extern          unsigned int ic1raw; /* actual raw passed to whoever wants it */
extern          unsigned int ic2raw;
extern          unsigned int ic3raw;
extern          unsigned int ic4raw;

extern          unsigned long   ic1tot; /* absolute pulse totals */
extern          unsigned long   ic2tot;
extern          unsigned long   ic3tot;
extern          unsigned long   ic4tot;

extern          unsigned long   ic1temp;/* averaging temp */
extern          unsigned long   ic2temp;
extern          unsigned long   ic3temp;
extern          unsigned long   ic4temp;

extern          unsigned int    ic1_old;/* to do new-old=period */
extern          unsigned int    ic2_old;
extern          unsigned int    ic3_old;
extern          unsigned int    ic4_old;

extern          int     ic1_ctr;/* to keep track of divide by 4 front */
extern          int     ic2_ctr;/* end raw average */
extern          int     ic3_ctr;
extern          int     ic4_ctr;
```

```
extern          int     time_out1;
extern          int     time_out2;
extern          int     time_out3;
extern          int     time_out4;

extern          int     run;
extern          int     steps;
extern          long    Wsq[10];
extern          long    ppq[10];
extern          long    Csq[10];
extern          int     Stage_touched[10];
extern          int     key_typ;
extern          float   hl;

/*extern                int     cyc_ctr;*/
extern          int     stage_ctr;

extern          int     ESC;
extern          long    ltemp;
extern          float   ftemp;

extern unsigned char temp[16];
extern          char    out_buf[MAXC_IN+1];
extern          STDIN,STDOUT;   /*point getc -putc to proper buffer*/
extern          int     scnt;
extern          int     btst;
extern          int     seconds;
extern          int     secflag;
extern          int     key_flg;/*.25 sec key switch check flag*/
extern          int     milclok;    /*initialize clocks*/
extern          int     tsec;   /*below used in RTC routines */
extern          int     tmin;
extern          int     thr;
extern          int     tpam;   /*am/pm*/
extern          int     old_sec;
extern          int     start_flg;
/*extern                int     RAMREF;*/
extern          int     STAT;
/*extern                TEXT            str0[64];*/
extern          TEXT    anlog_str[64];
extern          TEXT    count_str[64];
extern          TEXT    tmp_strng[64];
extern          long    tmp_long;       /*used for atol and others*/
extern          FILE    cfile[6];       /*make 6 comm files*/
/*extern                char            CH_TEXT;*/
#define         com1    cfile[0]        /*SCI in ,used for floppy storage*/
#define         com2    cfile[1]        /*SCI out, 9600 baud*/
#define         com3    cfile[2]        /* io485 in 9600 during test*/
#define         com4    cfile[3]        /* io485 out */
#define         com5    cfile[4]        /* LCD out,2400 baud*/
#define         com6    cfile[5]        /* LCD in (not used)*/

/* below for reference only */
    /*      12345678901234567890123456789012345678890*/
/*printf(""\x11%c%cMix Water        bbl/min |----->Stage   ",1,1);
    printf(""\x11%c%cDischarge       bbl/min |Total         ",2,1);
    printf(""\x11%c%cTarget ppq      RPM=    |Stage         ",3,1);
    printf(""\x11%c%cActual ppq      \"STEADY\"|             ",4,1);
*/ display_acs()
{
```

```c
/*remotedisplay(); */

STDOUT=comm5;
        if(timex==TRUE)
                {
                time(); timex=FALSE;/*keep time on screen*/
                printf("~\x11%c%c%3.1f ",1,12,(Water_rate/42));
                printf("~\x11%c%c%3.1f ",2,12,(Slurry_rate/42));
                printf("~\x11%c%c%2.2f ",3,12,Running_ppg);
                printf("~\x11%c%c%3.2f ",4,12,real_ppg);
/*              printf("~\x11%c%c%3.2f ",3,12,Dry_demand);
*/
                printf("~\x11%c%c%3.2f ",4,12,Dry_gallons_minute);
/*              printf("~\x11%c%c%2.1f ",3,21,inches);*/
/*              printf("~\x11%c%c%3d ",3,21,dry_step_rate);*/

/*                      if(dry_direction==UP)
                                printf("~\x11%c%c UP   ",4,19);
                        if(dry_direction==DOWN)
                                printf("~\x11%c%cDOWN ",4,19);
                        if((dry_direction !=DOWN ) && (d_direction != UP))
                                printf("~\x11%c%c NONE ",4,19);*/ if(startup==TRUE)
                                printf("~\x11%c%cSTup ",4,19);
                        if(Steady==TRUE && (Auto==ON))
                                printf("~\x11%c%c AUTO ",4,19);
                        if((startup != TRUE) && (Steady != TRUE) )
                                printf("~\x11%c%c_-_-_",4,19);

printf("~\x11%c%c%1d",1,39,stage_ctr+1);
/*              printf("~\x11%c%c%4d  ",3,33,tprint);*/
                printf("~\x11%c%c%4.2f ",2,33,(Slurry_total/42) );
                printf("~\x11%c%c%4.2f ",3,33,(stage_total/42) );
/*              printf("~\x11%c%c%4.2f ",2,33,dprint );*/
/*              printf("~\x11%c%c%4.2f ",3,33,gprint );*/
                printf("~\x11%c%c%2.1f ",3,29,gprint);
/*              printf("~\x11%c%c%4.1f ",2,33,Dry_gallons_minute);*/
/*              printf("~\x11%c%c%4.1f ",3,33,(Dry_rpm/60));*/
                }
/*test_dac();*/
} clear_dacs()
{
 char i;
unsigned char *_data;
unsigned char *_chanx;

_data=&DACDATA;
 _chanx=&CHANX;
 for(i=1; i<5 ; i++)
        {
        *_data=(unsigned char)0;
        *_chanx=i;
        SETDAC();
        }
}

/* dry dac test ----------------------------------------------------- */
```

```
DRY_DAC_UP(dry_val)
        { unsigned char *_data;
unsigned char *_chanx;
/*if(dry_val==0) dry_val=1;*/
/*if(dry_val>5) dry_val=5;*/
        dry_dac=dry_dac+dry_val;
                if(dry_dac>255) dry_dac=255;

_data=&DACDATA;
 _chanx=&CHANX;
        *_data=(unsigned char)dry_dac;
        *_chanx=(char)1;
        SETDAC();
        }

DRY_DAC_DOWN(dry_val)
        { unsigned char *_data;
unsigned char *_chanx;
/*if(dry_val==0) dry_val=1;*/
/*if(dry_val>5) dry_val=5;*/
        dry_dac=dry_dac-dry_val;
                if(dry_dac<0) dry_dac=0;

_data=&DACDATA;
 _chanx=&CHANX;
        *_data=(unsigned char)dry_dac;
        *_chanx=(char)1;
        SETDAC();
        }

/* water dac test ----------------------------------------------------- */

WATER_DAC_UP(wet_val)
        { unsigned char *_data;
unsigned char *_chanx;
/*if(wet_val==0) wet_val=1;*/
/*if(wet_val>5)  wet_val=5;*/
        water_dac=water_dac+wet_val;
                if(water_dac>255) water_dac=255;

_data=&DACDATA;
 _chanx=&CHANX;
        *_data=(unsigned char)water_dac;
        *_chanx=(char)2;
        SETDAC();
        }

WATER_DAC_DOWN(wet_val)
        { unsigned char *_data;
unsigned char *_chanx;
/*if(wet_val==0) wet_val=1;*/
/*if(wet_val>5)  wet_val=5;*/
        water_dac=water_dac-wet_val;
                if(water_dac<0) water_dac=0;
```

```
_data=&IADDR%;
_chanx=&CHANX;
    *_data=(unsigned char)water_dac;
    *_chanx=(char)2;
    SETDAC();
    } set_sens()/* frequency inputs*/
    {
unsigned int *xptr;
unsigned int pass;
    xptr=&pass;

*xptr=0x0564;
    dac(pass);

*xptr=0x0664;
    dac(pass);

*xptr=0x0764;
    dac(pass);

*xptr=0x0864;
    dac(pass);
    } int stage_chk(void)
    {
        key_typ=key_chk();
            if(key_typ==5)
                {
                stager++;
                qtr_key();
                    if(stager>STAGE_TRIG)
                        {
                        stage_ctr++;
                            if(stage_ctr>9)stage_ctr--;
                        stager=0;
                        stage_clr();
                        old_total=Slurry_total;
                        return(TRUE);
                        }

}
            else stager=0; /* else reset */
            return(FALSE);
        }
/*int do_a_d(ch_i)
    {return 1000 ;}
*/
int ppg_trim(void)
    {
        key_typ=key_chk();
            if(key_typ==4)
                {
                trimmer++;
                qtr_key();
                    if(trimmer>TRIM_TRIG)
                        {
                        trimmer=0;
            Running_ppg=Running_ppg+.01;/* check ppg  */
```

```
                        display_acs();
                                        return(TRUE);
                                }
                        display_acs();
                        return(FALSE);
                        }
                if(key_typ==3)
                        {
                        trimmer++;
                        qtr_key();
                                if(trimmer>TRIM_TRIG)
                                        {
                                        trimmer=0;
        Running_ppg=Running_ppg-.01;/* check ppg    */
                                if(Running_ppg<8) Running_ppg=8;
                                display_acs();
                                        return(TRUE);
                                }
                        display_acs();
                        return(FALSE);
                        }
                trimmer=0;
                return(FALSE);
        }

/*******************************************************************/ remotedisplay()                         /*dump data to remote screen*/
                {
#define CUSTOMER        "\x1B[4;30f       Globe Oilwell"
#define SYSTEM          "\x1B[5;30f    Automatic Cement System"
#define COPYRIGHT       "\x1B[6;30f       Copyright(c) 1993"
#define SSS             "\x1B[7;30fStewart and Stevenson Services"
#define SSADR           "\x1B[8;30f       Houston,Texas "
#define CLEAR           "\x1B[2J"
#define BOLD            "\x1B[1m"

int     outstd;
TEXT    mask = 0x40;
                outstd = STDOUT;
                STDOUT = comm2;
                printf(CLEAR);
                printf(BOLD);

printf(CUSTOMER);
                printf(SYSTEM);
                printf(COPYRIGHT);
                printf(SSS);
                printf(SSADR);

/*
        Running_Wsg;
        Running_ppg;
        Running_Csg;
        Target_sg;
        Dry_rpm;
        Dry_total;
        Dry_pounds_min;
        Cu_ft_min_dry;
        Water_rate;
```

```
Slurry_rate;
Slurry_total;
Water_percent;
Cement_percent;
Steady

*/

/*    2         3         4         5         6  */
              /*  0123456789_123456789_123456789_1234567890  */
    printf("\x1B[11;15fStage Wsg                    Stage----> ");
    printf("\x1B[12;15fStage Target ppg             Actual ppg  ");
    printf("\x1B[13;15fStage Csq");
    printf("\x1B[14;15fSlurry Rate                  Target sg");
    printf("\x1B[15;15fSlurry Total                 Dry RPM ");
    printf("\x1B[16;15fWater Rate                   Dry Total Estimate");
    printf("\x1B[17;15fWater Total                  Level inches ");
    printf("\x1B[18;15fWater Percent");
    printf("\x1B[19;15fCement Percent");
    printf("\x1B[20;15fSteady Y/N?                  ");

STDOUT = outstd;
}
```

We claim:

1. A method for automatically controlling the density of a cement slurry in a system comprising a mix water input line, a dry cement hopper with a regulating valve, and a mixing chamber for mixing the water and cement to produce a cement slurry, including the steps of:
   (a) measuring the rate at which slurry is discharged from the mixing chamber;
   (b) determining the percentage of water in the slurry;
   (c) calculating from steps (a) and (b) the rate at which water is being discharged;
   (d) setting the rate at which water is being input to the mixing chamber to be the same as the rate at which water is being discharged, as determined in step (c);
   (e) determining the percentage of dry, cement in the slurry;
   (f) calculating from steps (a) and (e) the rate at which dry cement is being discharged;
   (g) setting an approximate rate of operation for the valve on said hopper to deliver dry cement at approximately the same rate as the rate at which dry cement is discharging from the mixing chamber, as determined in step (f);
   (h) determining if the level of slurry in the mixing chamber is changing; and
   (i) adjusting the valve on said hopper in response to any change in slurry level in the mixing chamber.

2. A method as in claim 1, further comprising the steps of:
   (j) measuring the density of the slurry;
   (k) comparing the measured density obtained in step (j) with a desired density;
   (l) calculating a correction factor based upon the difference between measured density and desired density; and
   (m) adjusting the rate at which water is being input to the mixing chamber based upon the correction factor calculated in step (l).

3. A method as in claim 2, wherein the step for calculating the correction factor (step (l)) and for adjusting the rate (step (m)), comprises the steps of:
   (l)(1) recalibrating the manner in which the discharge rate is determined according to the correction factor calculated in step (l); and
   (m)(1) repeating steps (e) and (d).

4. A method as in claim 1, wherein the percentage of water in the slurry is obtained from data input by an operator.

5. A method for automatically controlling the density of a cement slurry, comprising the steps of:
   (a) delivering mix water at an initial rate to a mixing chamber;
   (b) initializing the delivery of dry cement to the mixing chamber;
   (c) combining the mix water and dry cement to produce a cement slurry;
   (d) recirculating the slurry until the density of the slurry equals a desired density;
   (e) opening a discharge valve to begin discharging the slurry;
   (f) measuring the discharge rate of the slurry;
   (g) determining the necessary rate that mix water should be supplied to the mixing chamber based upon the measurement in step (f); and
   (h) setting an input device to provide the necessary rate of mix water as determined in step (g).

6. A method as in claim 5, wherein the step of determining the amount of mix water that should be supplied to the mixing chamber includes the following steps;
   (g)(1) inputting data regarding the target slurry density, the density of the mix water, and the density of the dry cement;
   (g)(2) calculating the percentage by volume of liquid in the slurry based upon the parameters entered in step (g)(1); and
   (g)(3) multiplying the percentage of liquid obtained from step (g)(2) by the discharge rate obtained in step (f), to determine the amount of liquid that should be supplied to the mixing chamber.

7. A method as in claim 6, further comprising the steps of:
   (i) determining the amount of dry cement to deliver to the mixing chamber;
   (j) setting a regulating device to deliver the approximate amount of dry cement as determined in step (i).

8. A method as in claim 7, wherein the step of determining the amount of dry cement to deliver includes the following steps;
   (i)(1) calculating the percentage of dry cement in the slurry based upon the information input in step (g)(1);
   (i)(2) multiplying the percentage of dry cement obtained from step (i)(1) by the discharge rate obtained in step (f), to determine the amount of dry cement that should be supplied to the mixing chamber.

9. A method as in claim 8, further including the steps of:
   (k) monitoring the level of slurry in the mixing chamber;
   (l) adjusting the operational setting of the regulating device to maintain the slurry level constant in the mixing chamber.

10. A method for automatically controlling the density of a cement slurry in a system comprising a mix water input line, a dry cement hopper with a regulating valve, and a mixing chamber for mixing the water and cement to produce a cement slurry, including the steps of:
    (a) measuring the rate at which slurry is discharged from the mixing chamber;
    (b) determining the percentage of water in the slurry;
    (c) calculating from steps (a) and (b) the rate at which water is being discharged;
    (d) setting the rate at which water is being input to the mixing chamber to be the same as the rate at which water is being discharged, as determined in step (c);
    (e) determining the percentage of dry cement in the slurry;
    (f) calculating from steps (a) and (e) the rate at which dry cement is being discharged;
    (g) setting an approximate rate of operation for the valve on said hopper to deliver dry cement at approximately the same rate as the rate at which dry cement is discharging from the mixing chamber, as determined in step (f);
    (h) adjusting the valve on said hopper in response to any change in slurry level in the mixing chamber.

11. A method as in claim 10, further comprising the steps of:
    (i) measuring the density of the slurry;
    (j) comparing the measured density obtained in step (i) with a desired density;
    (k) calculating a correction factor based upon the difference between measured density and desired density; and (l) adjusting the rate at which water is being input to the mixing chamber based upon the correction factor calculated in step (k).

12. A method as in claim 11, wherein the step for calculating the correction factor (step (k)) and for adjusting the rate (step (l)), comprises the steps of:

(k)(1) recalibrating the manner in which the discharge rate is determined according to the correction factor calculated in step (k); and (l)(1) repeating steps (e) and (d).

13. A method as in claim 10, wherein the percentage of water in the slurry is obtained from data input by an operator.

14. A method for automatically controlling the density of a cement slurry, comprising the steps of:

(a) setting an input device to deliver an initial rate of mix water to a mixing chamber;

(b) initializing the delivery of dry cement to the mixing chamber;

(c) combining the mix water and dry cement to produce a cement slurry;

(d) recirculating the slurry until the density of the slurry equals a desired density;

(e) opening a discharge valve to begin discharging the slurry;

(f) measuring the discharge rate of the slurry;

(g) determining the rate that mix water should be supplied to the mixing chamber based upon the measurement in step (f), by:

(g)(1) inputting data regarding the target slurry density, the density of the mix water, and the density of the dry cement;

(g)(2) calculating the percentage by volume of liquid in the slurry based upon the parameters entered in step (g)(1); and (g)(3) multiplying the percentage of liquid obtained from step (g)(2) by the discharge rate obtained in step (f), to determine the amount of liquid that should be supplied to the mixing chamber; and (h) setting an input device to provide the necessary amount of mix water as determined in step (g).

15. A method as in claim 14, further comprising the steps of:

(i) determining the amount of dry cement to deliver to the mixing chamber;

(j) setting a regulating device to deliver the approximate amount of dry cement as determined in step (i).

16. A method as in claim 15, wherein the step of determining the amount of dry cement to deliver includes the following steps;

(i)(1) calculating the percentage of dry cement in the slurry based upon the information input in step (g)(1);

(i)(2) multiplying the percentage of dry cement obtained from step (i)(1) by the discharge rate obtained in step (f), to determine the amount of dry cement that should be supplied to the mixing chamber.

17. A method as in claim 16, further including the steps of:

(k) monitoring the level of slurry in the mixing chamber;

(l) adjusting the operational setting of the regulating device to maintain the slurry level constant in the mixing chamber.

* * * * *